(12) United States Patent
Ngo et al.

(10) Patent No.: US 10,540,327 B2
(45) Date of Patent: Jan. 21, 2020

(54) SYNCHRONIZED DATA DEDUPLICATION

(71) Applicant: Commvault Systems, Inc., Tinton Falls, NJ (US)

(72) Inventors: David Ngo, Shrewsbury, NJ (US); Marcus S. Muller, Maynard, MA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 155 days.

(21) Appl. No.: 15/684,812

(22) Filed: Aug. 23, 2017

(65) Prior Publication Data

US 2018/0075055 A1    Mar. 15, 2018

Related U.S. Application Data

(63) Continuation of application No. 14/555,322, filed on Nov. 26, 2014, now abandoned, which is a
(Continued)

(51) Int. Cl.
*G06F 17/30*     (2006.01)
*G06F 16/174*    (2019.01)
(Continued)

(52) U.S. Cl.
CPC ........ *G06F 16/1748* (2019.01); *G06F 16/178* (2019.01); *G06F 16/1756* (2019.01);
(Continued)

(58) Field of Classification Search
CPC .............. G06F 16/1748; G06F 16/182; G06F 16/1756; G06F 16/178; G06F 16/273; H04L 67/1097
See application file for complete search history.

(56) References Cited

U.S. PATENT DOCUMENTS 4,084,231 A   4/1978 Capozzi et al.
4,267,568 A   5/1981 Dechant et al.
(Continued)

FOREIGN PATENT DOCUMENTS

EP   0259912   3/1988
EP   0405926   1/1991
(Continued)

OTHER PUBLICATIONS

Armstead et al., "Implementation of a Campus-Wide Distributed Mass Storage Service: The Dream vs. Reality," IEEE, 1995, pp. 190-199.
(Continued)

*Primary Examiner* — Jared M Bibbee
(74) *Attorney, Agent, or Firm* — Knobbe, Martens, Olson & Bear, LLP

(57) ABSTRACT

A system and method for data deduplication is presented. Data received from one or more computing systems is deduplicated, and the results of the deduplication process stored in a reference table. A representative subset of the reference table is shared among a plurality of systems that utilize the data deduplication repository. This representative subset of the reference table can be used by the computing systems to deduplicate data locally before it is sent to the repository for storage. Likewise, it can be used to allow deduplicated data to be returned from the repository to the computing systems. In some cases, the representative subset can be a proper subset wherein a portion of the referenced table is identified shared among the computing systems to reduce bandwidth requirements for reference-table synchronization.

14 Claims, 9 Drawing Sheets

Related U.S. Application Data continuation of application No. 12/499,717, filed on Jul. 8, 2009, now Pat. No. 8,930,306.

(51) Int. Cl.
  *G06F 16/178* (2019.01)
  *G06F 16/182* (2019.01)
  *H04L 29/08* (2006.01)
  *G06F 16/27* (2019.01)

(52) U.S. Cl.
  CPC ........ *G06F 16/182* (2019.01); *H04L 67/1097* (2013.01); *G06F 16/273* (2019.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,403,639 A | 4/1995 | Belsan |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,491,810 A | 2/1996 | Allen |
| 5,495,607 A | 2/1996 | Pisello et al. |
| 5,499,367 A | 3/1996 | Bamford et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,625,793 A | 4/1997 | Mirza |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura |
| 5,729,743 A | 3/1998 | Squibb |
| 5,732,240 A | 3/1998 | Caccavale |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,828 A | 8/1998 | Jost |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,875,481 A | 2/1999 | Ashton |
| 5,878,408 A | 3/1999 | Van Huben |
| 5,887,134 A | 3/1999 | Ebrahim |
| 5,901,327 A | 5/1999 | Ofek |
| 5,907,672 A | 5/1999 | Matze |
| 5,924,102 A | 7/1999 | Perks |
| 5,930,831 A | 7/1999 | Marsh et al. |
| 5,940,833 A | 8/1999 | Benson |
| 5,950,205 A | 9/1999 | Aviani, Jr. |
| 5,956,519 A | 9/1999 | Wise |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,038,379 A | 3/2000 | Fletcher et al. |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,163,856 A | 12/2000 | Dion |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,286,084 B1 | 9/2001 | Wexler et al. |
| 6,289,432 B1 | 9/2001 | Ault et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,366,986 B1 | 4/2002 | St. Pierre |
| 6,366,988 B1 | 4/2002 | Skiba |
| 6,374,336 B1 | 4/2002 | Peters |
| 6,389,432 B1 | 5/2002 | Pothapragada et al. |
| 6,397,308 B1 | 5/2002 | Ofek |
| 6,418,478 B1 | 7/2002 | Ignatius et al. |
| 6,421,711 B1 | 7/2002 | Blumenau et al. |
| 6,425,057 B1 | 7/2002 | Cherkasova et al. |
| 6,438,368 B1 | 8/2002 | Phillips |
| 6,487,561 B1 | 11/2002 | Ofek et al. |
| 6,496,850 B1 | 12/2002 | Bowman-Amuah |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,557,030 B1 | 4/2003 | Hoang |
| 6,557,089 B1 | 4/2003 | Reed |
| 6,564,228 B1 | 5/2003 | O'Connor |
| 6,625,623 B1 | 9/2003 | Midgley et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan |
| 6,665,815 B1 | 12/2003 | Goldstein |
| 6,704,730 B2 | 3/2004 | Moulton et al. |
| 6,721,767 B2 | 4/2004 | De Meno et al. |
| 6,732,125 B1 | 5/2004 | Autry |
| 6,757,794 B2 | 6/2004 | Cabrera et al. |
| 6,760,723 B2 | 7/2004 | Oshinsky et al. |
| 6,760,812 B1 | 7/2004 | Degenaro et al. |
| 6,779,093 B1 | 8/2004 | Gupta |
| 6,789,161 B1 | 9/2004 | Blendermann |
| 6,799,258 B1 | 9/2004 | Linde |
| 6,810,398 B2 | 10/2004 | Moulton |
| 6,823,377 B1 | 11/2004 | Wu et al. |
| 6,865,655 B1 | 3/2005 | Andersen |
| 6,886,020 B1 | 4/2005 | Zahavi |
| 6,912,629 B1 | 6/2005 | West et al. |
| 6,952,758 B2 | 10/2005 | Chron et al. |
| 6,983,351 B2 | 1/2006 | Gibble |
| 7,003,641 B2 | 2/2006 | Prahlad et al. |
| 7,028,096 B1 | 4/2006 | Lee |
| 7,035,880 B1 | 4/2006 | Crescenti et al. |

(56) References Cited

U.S. PATENT DOCUMENTS

| | | | |
|---|---|---|---|
| 7,065,619 | B1 | 6/2006 | Zhu et al. |
| 7,082,441 | B1 | 7/2006 | Zahavi |
| 7,085,904 | B2 | 8/2006 | Mizuno et al. |
| 7,100,089 | B1 | 8/2006 | Phelps |
| 7,103,617 | B2 | 9/2006 | Phatak |
| 7,107,298 | B2 | 9/2006 | Prahlad et al. |
| 7,107,395 | B1 | 9/2006 | Ofek |
| 7,117,246 | B2 | 10/2006 | Christenson et al. |
| 7,130,860 | B2 | 10/2006 | Pachet |
| 7,130,970 | B2 | 10/2006 | Devassy et al. |
| 7,143,091 | B2 | 11/2006 | Charnock |
| 7,155,465 | B2 | 12/2006 | Lee |
| 7,155,633 | B2 | 12/2006 | Tuma |
| 7,162,496 | B2 | 1/2007 | Amarendran et al. |
| 7,174,433 | B2 | 2/2007 | Kottomtharayil et al. |
| 7,194,454 | B2 | 3/2007 | Hansen |
| 7,197,665 | B2 | 3/2007 | Goldstein |
| 7,225,210 | B2 | 5/2007 | Guthrie, II |
| 7,243,163 | B1 | 7/2007 | Friend et al. |
| 7,246,207 | B2 | 7/2007 | Kottomtharayil et al. |
| 7,246,272 | B2 | 7/2007 | Cabezas et al. |
| 7,272,606 | B2 | 9/2007 | Borthakur et al. |
| 7,284,030 | B2 | 10/2007 | Ackaouy et al. |
| 7,287,252 | B2 | 10/2007 | Bussiere et al. |
| 7,315,923 | B2 | 1/2008 | Retnamma et al. |
| 7,343,356 | B2 | 3/2008 | Prahlad |
| 7,343,453 | B2 | 3/2008 | Prahlad et al. |
| 7,343,459 | B2 | 3/2008 | Prahlad |
| 7,346,751 | B2 | 3/2008 | Prahlad |
| 7,383,462 | B2 | 6/2008 | Osaki et al. |
| 7,389,311 | B1 | 6/2008 | Crescenti et al. |
| 7,395,282 | B1 | 7/2008 | Crescenti et al. |
| 7,412,583 | B2 | 8/2008 | Burton |
| 7,437,388 | B1 | 10/2008 | DeVos |
| 7,440,982 | B2 | 10/2008 | Lu et al. |
| 7,454,569 | B2 | 11/2008 | Kavuri et al. |
| 7,472,238 | B1 | 12/2008 | Gokhale et al. |
| 7,472,242 | B1 | 12/2008 | Deshmukh et al. |
| 7,490,207 | B2 | 2/2009 | Amarendran et al. |
| 7,500,053 | B1 | 3/2009 | Kavuri et al. |
| 7,512,595 | B1 | 3/2009 | McBride et al. |
| 7,516,186 | B1 | 4/2009 | Borghetti et al. |
| 7,519,726 | B2 | 4/2009 | Palliyll et al. |
| 7,529,782 | B2 | 5/2009 | Prahlad et al. |
| 7,536,291 | B1 | 5/2009 | Vijayan Retnamma et al. |
| 7,539,710 | B1 | 5/2009 | Haustein et al. |
| 7,543,125 | B2 | 6/2009 | Gokhale |
| 7,546,324 | B2 | 6/2009 | Prahlad et al. |
| 7,552,358 | B1 | 6/2009 | Asgar-Deen et al. |
| 7,568,080 | B2 | 7/2009 | Prahlad et al. |
| 7,574,692 | B2 | 8/2009 | Herscu |
| 7,577,806 | B2 | 8/2009 | Rowan |
| 7,581,077 | B2 | 8/2009 | Ignatius et al. |
| 7,584,338 | B1 | 9/2009 | Bricker et al. |
| 7,603,386 | B2 | 10/2009 | Amarendran et al. |
| 7,606,844 | B2 | 10/2009 | Kottomtharayil |
| 7,613,748 | B2 | 11/2009 | Brockway et al. |
| 7,613,752 | B2 | 11/2009 | Prahlad et al. |
| 7,617,253 | B2 | 11/2009 | Prahlad et al. |
| 7,617,262 | B2 | 11/2009 | Prahlad et al. |
| 7,620,710 | B2 | 11/2009 | Kottomtharayil et al. |
| 7,631,194 | B2 | 12/2009 | Wahlert et al. |
| 7,636,743 | B2 | 12/2009 | Erofeev |
| 7,651,593 | B2 | 1/2010 | Prahlad et al. |
| 7,657,550 | B2 | 2/2010 | Prahlad et al. |
| 7,660,807 | B2 | 2/2010 | Prahlad et al. |
| 7,661,028 | B2 | 2/2010 | Prahlad et al. |
| 7,664,771 | B2 | 2/2010 | Kusters |
| 7,685,126 | B2 | 3/2010 | Patel et al. |
| 7,702,782 | B1 | 4/2010 | Pai |
| 7,720,841 | B2 | 5/2010 | Gu et al. |
| 7,730,113 | B1 | 6/2010 | Payette et al. |
| 7,734,669 | B2 | 6/2010 | Kottomtharayil et al. |
| 7,734,820 | B1 | 6/2010 | Ranade et al. |
| 7,739,235 | B2 | 6/2010 | Rousseau |
| 7,743,051 | B1 | 6/2010 | Kashyap et al. |
| 7,747,577 | B2 | 6/2010 | Cannon et al. |
| 7,747,579 | B2 | 6/2010 | Prahlad et al. |
| 7,761,425 | B1 | 7/2010 | Erickson et al. |
| 7,797,279 | B1 | 9/2010 | Starling et al. |
| 7,801,864 | B2 | 9/2010 | Prahlad et al. |
| 7,809,914 | B2 | 10/2010 | Kottomtharayil et al. |
| 7,814,074 | B2 | 10/2010 | Anglin et al. |
| 7,814,149 | B1 | 10/2010 | Stringham |
| 7,822,939 | B1 | 10/2010 | Veprinsky et al. |
| 7,827,150 | B1 | 11/2010 | Wu et al. |
| 7,831,795 | B2 | 11/2010 | Prahlad et al. |
| 7,840,533 | B2 | 11/2010 | Prahlad et al. |
| 7,899,871 | B1 | 3/2011 | Kumar et al. |
| 7,962,452 | B2 | 6/2011 | Anglin et al. |
| 8,074,043 | B1 | 12/2011 | Zeis |
| 8,095,756 | B1 | 1/2012 | Somavarapu |
| 8,108,446 | B1 | 1/2012 | Christiaens |
| 8,108,638 | B2 | 1/2012 | Kishi |
| 8,131,669 | B2 | 3/2012 | Cannon et al. |
| 8,145,614 | B1 | 3/2012 | Zimran et al. |
| 8,156,086 | B2 | 4/2012 | Lu et al. |
| 8,170,995 | B2 | 5/2012 | Prahlad et al. |
| 8,199,911 | B1 | 6/2012 | Tsaur et al. |
| 8,200,638 | B1 | 6/2012 | Zheng et al. |
| 8,200,923 | B1 | 6/2012 | Healey et al. |
| 8,204,862 | B1 | 6/2012 | Paulzagade et al. |
| 8,209,334 | B1 | 6/2012 | Doerner |
| 8,224,875 | B1 | 7/2012 | Christiaens et al. |
| 8,229,954 | B2 | 7/2012 | Kottomtharayil et al. |
| 8,230,195 | B2 | 7/2012 | Amarendran et al. |
| 8,261,240 | B2 | 9/2012 | Hoban |
| 8,280,854 | B1 | 10/2012 | Emmert |
| 8,285,681 | B2 | 10/2012 | Prahlad et al. |
| 8,307,177 | B2 | 11/2012 | Prahlad et al. |
| 8,352,422 | B2 | 1/2013 | Prahlad et al. |
| 8,364,652 | B2 | 1/2013 | Vijayan et al. |
| 8,370,315 | B1 | 2/2013 | Efstathopoulos et al. |
| 8,370,542 | B2 | 2/2013 | Lu et al. |
| 8,375,008 | B1 | 2/2013 | Gomes |
| 8,375,181 | B1 | 2/2013 | Kekre et al. |
| 8,407,190 | B2 | 3/2013 | Prahlad et al. |
| 8,468,320 | B1 | 6/2013 | Stringham |
| 8,484,162 | B2 | 7/2013 | Prahlad et al. |
| 8,510,573 | B2 | 8/2013 | Muller et al. |
| 8,527,469 | B2 | 9/2013 | Hwang et al. |
| 8,549,350 | B1 | 10/2013 | Dutch et al. |
| 8,572,340 | B2 | 10/2013 | Vijayan et al. |
| 8,577,851 | B2 | 11/2013 | Vijayan et al. |
| 8,578,109 | B2 | 11/2013 | Vijayan et al. |
| 8,578,120 | B2 | 11/2013 | Attarde et al. |
| 8,595,191 | B2 | 11/2013 | Prahlad et al. |
| 8,621,240 | B1 | 12/2013 | Auchmoody et al. |
| 8,645,320 | B2 | 2/2014 | Prahlad et al. |
| 8,719,264 | B2 | 5/2014 | Varadharajan |
| 8,725,688 | B2 | 5/2014 | Lad |
| 8,726,242 | B2 | 5/2014 | Ngo |
| 8,745,105 | B2 | 6/2014 | Erofeev |
| 8,775,823 | B2 | 7/2014 | Gokhale et al. |
| 8,849,762 | B2 | 9/2014 | Kumarasamy et al. |
| 8,909,980 | B1 | 12/2014 | Lewis et al. |
| 8,930,306 | B1 | 1/2015 | Ngo et al. |
| 8,938,481 | B2 | 1/2015 | Kumarasamy et al. |
| 8,954,446 | B2 | 2/2015 | Vijayan et al. |
| 9,020,900 | B2 | 4/2015 | Vijayan et al. |
| 9,092,441 | B1 | 7/2015 | Patiejunas et al. |
| 9,098,495 | B2 | 8/2015 | Gokhale |
| 9,104,623 | B2 | 8/2015 | Vijayan et al. |
| 9,110,602 | B2 | 8/2015 | Vijayan et al. |
| 9,116,850 | B2 | 8/2015 | Vijayan et al. |
| 9,128,901 | B1 | 9/2015 | Nickurak |
| 9,171,008 | B2 | 10/2015 | Prahlad et al. |
| 9,208,160 | B2 | 12/2015 | Prahlad et al. |
| 9,218,374 | B2 | 12/2015 | Muller et al. |
| 9,218,375 | B2 | 12/2015 | Muller et al. |
| 9,218,376 | B2 | 12/2015 | Muller et al. |
| 9,239,687 | B2 | 1/2016 | Vijayan et al. |
| 9,251,186 | B2 | 2/2016 | Muller et al. |
| 9,298,715 | B2 | 3/2016 | Kumarasamy et al. |

(56) References Cited

U.S. PATENT DOCUMENTS

| | | |
|---|---|---|
| 9,298,724 B1 | 3/2016 | Patil et al. |
| 9,323,820 B1 | 4/2016 | Lauinger et al. |
| 9,342,537 B2 | 5/2016 | Kumarasamy et al. |
| 9,405,631 B2 | 8/2016 | Prahlad et al. |
| 9,405,763 B2 | 8/2016 | Prahlad et al. |
| 9,442,806 B1 | 9/2016 | Bardale |
| 9,575,673 B2 | 2/2017 | Mitkar et al. |
| 9,619,480 B2 | 4/2017 | Vijayan et al. |
| 9,633,033 B2 | 4/2017 | Vijayan et al. |
| 9,633,056 B2 | 4/2017 | Attarde et al. |
| 9,639,289 B2 | 5/2017 | Vijayan et al. |
| 9,665,591 B2 | 5/2017 | Vijayan et al. |
| 9,678,968 B1 | 6/2017 | Taylor et al. |
| 9,858,156 B2 | 1/2018 | Muller et al. |
| 9,898,225 B2 | 2/2018 | Vijayan et al. |
| 9,898,478 B2 | 2/2018 | Vijayan et al. |
| 9,934,238 B2 | 4/2018 | Mitkar et al. |
| 9,990,253 B1 | 6/2018 | Rajimwale et al. |
| 10,061,663 B2 | 8/2018 | Vijayan et al. |
| 10,126,973 B2 | 11/2018 | Vijayan et al. |
| 10,176,053 B2 | 1/2019 | Muller et al. |
| 10,191,816 B2 | 1/2019 | Vijayan et al. |
| 10,229,133 B2 | 3/2019 | Vijayan et al. |
| 10,255,143 B2 | 4/2019 | Vijayan et al. |
| 10,310,953 B2 | 6/2019 | Vijayan et al. |
| 10,339,106 B2 | 7/2019 | Vijayan et al. |
| 10,380,072 B2 | 8/2019 | Attarde et al. |
| 10,387,269 B2 | 8/2019 | Muller et al. |
| 2001/0052015 A1 | 12/2001 | Lin et al. |
| 2002/0062439 A1 | 5/2002 | Cotugno et al. |
| 2002/0065892 A1 | 5/2002 | Malik |
| 2002/0083055 A1 | 6/2002 | Pachet |
| 2002/0107877 A1 | 8/2002 | Whiting et al. |
| 2002/0133601 A1 | 9/2002 | Kennamer et al. |
| 2002/0143892 A1 | 10/2002 | Mogul |
| 2002/0144250 A1 | 10/2002 | Yen |
| 2002/0169934 A1 | 11/2002 | Krapp et al. |
| 2003/0033308 A1 | 2/2003 | Patel et al. |
| 2003/0084076 A1 | 5/2003 | Sekiguchi et al. |
| 2003/0105716 A1 | 6/2003 | Lorin, Jr. et al. |
| 2003/0115346 A1 | 6/2003 | McHenry et al. |
| 2003/0149750 A1 | 8/2003 | Franzenburg |
| 2003/0172130 A1 | 9/2003 | Fruchtman et al. |
| 2003/0174648 A1 | 9/2003 | Wang et al. |
| 2003/0182310 A1 | 9/2003 | Charnock et al. |
| 2003/0187917 A1 | 10/2003 | Cohen |
| 2003/0188106 A1 | 10/2003 | Cohen |
| 2004/0010562 A1 | 1/2004 | Itonaga |
| 2004/0128442 A1 | 7/2004 | Hinshaw et al. |
| 2004/0148306 A1 | 7/2004 | Moulton et al. |
| 2004/0181519 A1 | 9/2004 | Anwar |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0060643 A1 | 3/2005 | Glass et al. |
| 2005/0066118 A1 | 3/2005 | Perry |
| 2005/0066225 A1 | 3/2005 | Rowan |
| 2005/0108292 A1 | 5/2005 | Burton |
| 2005/0114450 A1 | 5/2005 | DeVos |
| 2005/0117558 A1 | 6/2005 | Angermann et al. |
| 2005/0144202 A1 | 6/2005 | Chen |
| 2005/0204108 A1 | 9/2005 | Ofek et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0268068 A1 | 12/2005 | Ignatius et al. |
| 2005/0273654 A1 | 12/2005 | Chen et al. |
| 2006/0004808 A1 | 1/2006 | Hsu et al. |
| 2006/0005048 A1 | 1/2006 | Osaki |
| 2006/0010227 A1 | 1/2006 | Atluri |
| 2006/0020660 A1 | 1/2006 | Prasad et al. |
| 2006/0064456 A1 | 3/2006 | Kalthoff et al. |
| 2006/0074957 A1 | 4/2006 | Yamamoto et al. |
| 2006/0089954 A1 | 4/2006 | Anschutz |
| 2006/0095527 A1 | 5/2006 | Malik |
| 2006/0101096 A1 | 5/2006 | Fuerst |
| 2006/0129537 A1 | 6/2006 | Torii |
| 2006/0136685 A1 | 6/2006 | Griv |
| 2006/0167900 A1 | 7/2006 | Pingte et al. |
| 2006/0168318 A1 | 7/2006 | Twiss |
| 2006/0179261 A1 | 8/2006 | Twiss |
| 2006/0179405 A1 | 8/2006 | Chao et al. |
| 2006/0224846 A1 | 10/2006 | Amarendran et al. |
| 2007/0006018 A1 | 1/2007 | Thompson |
| 2007/0038714 A1 | 2/2007 | Sell |
| 2007/0043757 A1 | 2/2007 | Benton et al. |
| 2007/0050526 A1 | 3/2007 | Abe et al. |
| 2007/0067263 A1 | 3/2007 | Syed |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179990 A1 | 8/2007 | Zimran et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0089342 A1 | 4/2008 | Lansing et al. |
| 2008/0091655 A1 | 4/2008 | Gokhale et al. |
| 2008/0091725 A1 | 4/2008 | Hwang et al. |
| 2008/0098041 A1 | 4/2008 | Chidambaran et al. |
| 2008/0098083 A1 | 4/2008 | Shergill et al. |
| 2008/0133561 A1 | 6/2008 | Dubnicki et al. |
| 2008/0140630 A1 | 6/2008 | Sato et al. |
| 2008/0159331 A1 | 7/2008 | Mace et al. |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1 | 10/2008 | Cremelie et al. |
| 2008/0244205 A1 | 10/2008 | Amano |
| 2008/0250204 A1 | 10/2008 | Kavuri et al. |
| 2008/0256326 A1 | 10/2008 | Patterson et al. |
| 2008/0256431 A1 | 10/2008 | Hornberger |
| 2008/0281908 A1 | 11/2008 | McCanne et al. |
| 2008/0294660 A1 | 11/2008 | Patterson et al. |
| 2008/0294696 A1 | 11/2008 | Frandzel |
| 2008/0313236 A1 | 12/2008 | Vijayakumar et al. |
| 2008/0320151 A1 | 12/2008 | McCanne et al. |
| 2009/0013129 A1 | 1/2009 | Bondurant |
| 2009/0013258 A1 | 1/2009 | Hintermeister et al. |
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0171888 A1 | 7/2009 | Anglin |
| 2009/0172139 A1 | 7/2009 | Wong et al. |
| 2009/0182789 A1 | 7/2009 | Sandorfi et al. |
| 2009/0183162 A1 | 7/2009 | Kindel et al. |
| 2009/0204636 A1 | 8/2009 | Li et al. |
| 2009/0204649 A1 | 8/2009 | Wong et al. |
| 2009/0210431 A1 | 8/2009 | Marinkovic et al. |
| 2009/0243846 A1 | 10/2009 | Yuuki |
| 2009/0254507 A1 | 10/2009 | Hosoya et al. |
| 2009/0268903 A1 | 10/2009 | Bojinov et al. |
| 2009/0271454 A1 | 10/2009 | Anglin et al. |
| 2009/0276454 A1 | 11/2009 | Smith |
| 2009/0307251 A1 | 12/2009 | Heller et al. |
| 2009/0319534 A1 | 12/2009 | Gokhale |
| 2009/0319585 A1 | 12/2009 | Gokhale |
| 2009/0327625 A1 | 12/2009 | Jaquette et al. |

(56) References Cited

U.S. PATENT DOCUMENTS

| | | |
|---|---|---|
| 2010/0005259 A1 | 1/2010 | Prahlad |
| 2010/0011178 A1 | 1/2010 | Feathergill |
| 2010/0031086 A1 | 2/2010 | Leppard |
| 2010/0036887 A1 | 2/2010 | Anglin et al. |
| 2010/0042790 A1 | 2/2010 | Mondal et al. |
| 2010/0049926 A1 | 2/2010 | Fuente et al. |
| 2010/0049927 A1 | 2/2010 | Fuente et al. |
| 2010/0070478 A1 | 3/2010 | Anglin |
| 2010/0077161 A1 | 3/2010 | Stoakes et al. |
| 2010/0082558 A1 | 4/2010 | Anglin et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0100529 A1 | 4/2010 | Erofeev |
| 2010/0114833 A1 | 5/2010 | Mu |
| 2010/0153511 A1 | 6/2010 | Lin et al. |
| 2010/0169287 A1 | 7/2010 | Klose |
| 2010/0180075 A1 | 7/2010 | McCloskey et al. |
| 2010/0198864 A1 | 8/2010 | Ravid et al. |
| 2010/0223495 A1 | 9/2010 | Leppard |
| 2010/0250501 A1 | 9/2010 | Mandagere et al. |
| 2010/0250549 A1 | 9/2010 | Muller et al. |
| 2010/0250896 A1 | 9/2010 | Matze |
| 2010/0257142 A1 | 10/2010 | Murphy et al. |
| 2010/0257346 A1 | 10/2010 | Sosnosky et al. |
| 2010/0257403 A1 | 10/2010 | Virk et al. |
| 2010/0306283 A1 | 12/2010 | Johnson et al. |
| 2010/0312752 A1 | 12/2010 | Zeis et al. |
| 2010/0318759 A1 | 12/2010 | Hamilton et al. |
| 2010/0332454 A1 | 12/2010 | Prahlad et al. |
| 2011/0010498 A1 | 1/2011 | Lay et al. |
| 2011/0060940 A1 | 3/2011 | Taylor et al. |
| 2011/0072291 A1 | 3/2011 | Murase |
| 2011/0113012 A1 | 5/2011 | Gruhl et al. |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0153570 A1 | 6/2011 | Kim et al. |
| 2011/0161723 A1 | 6/2011 | Taleck et al. |
| 2011/0167221 A1 | 7/2011 | Pangal et al. |
| 2011/0258161 A1 | 10/2011 | Constantinescu et al. |
| 2011/0276543 A1 | 11/2011 | Matze |
| 2011/0289281 A1 | 11/2011 | Spackman |
| 2011/0302140 A1 | 12/2011 | Gokhale et al. |
| 2011/0314070 A1 | 12/2011 | Brown et al. |
| 2011/0314400 A1 | 12/2011 | Mital et al. |
| 2012/0011101 A1 | 1/2012 | Fang et al. |
| 2012/0016839 A1 | 1/2012 | Yueh |
| 2012/0016845 A1 | 1/2012 | Bates |
| 2012/0078881 A1 | 3/2012 | Crump et al. |
| 2012/0084272 A1 | 4/2012 | Garces-Erice et al. |
| 2012/0089574 A1 | 4/2012 | Doerner |
| 2012/0150818 A1 | 6/2012 | Vijayan Retnamma et al. |
| 2012/0166403 A1 | 6/2012 | Kim et al. |
| 2012/0185437 A1 | 7/2012 | Pavlov et al. |
| 2012/0221817 A1 | 8/2012 | Yueh |
| 2012/0233417 A1 | 9/2012 | Kalach |
| 2012/0303622 A1 | 11/2012 | Dean et al. |
| 2013/0006943 A1 | 1/2013 | Chavda et al. |
| 2013/0238562 A1 | 9/2013 | Kumarasamy et al. |
| 2013/0238572 A1 | 9/2013 | Prahlad et al. |
| 2013/0262396 A1 | 10/2013 | Kripalani et al. |
| 2013/0339298 A1 | 12/2013 | Muller et al. |
| 2013/0339310 A1 | 12/2013 | Muller et al. |
| 2014/0032940 A1 | 1/2014 | Sartirana et al. |
| 2014/0115287 A1 | 4/2014 | Schnapp et al. |
| 2014/0181028 A1 | 6/2014 | Prahlad et al. |
| 2014/0195749 A1 | 7/2014 | Colgrove et al. |
| 2014/0201142 A1 | 7/2014 | Varadharajan et al. |
| 2014/0201150 A1 | 7/2014 | Kumarasamy et al. |
| 2014/0201153 A1 | 7/2014 | Vijayan et al. |
| 2014/0229451 A1 | 8/2014 | Venkatesh et al. |
| 2014/0250076 A1 | 9/2014 | Lad |
| 2014/0258245 A1 | 9/2014 | Estes |
| 2014/0281758 A1 | 9/2014 | Klein et al. |
| 2014/0337285 A1 | 11/2014 | Gokhale et al. |
| 2014/0337664 A1 | 11/2014 | Gokhale et al. |
| 2015/0012698 A1 | 1/2015 | Bolla et al. |
| 2015/0088821 A1 | 3/2015 | Blea et al. |
| 2015/0154220 A1 | 6/2015 | Ngo et al. |
| 2015/0161015 A1 | 6/2015 | Kumarasamy et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Pawar et al. |
| 2015/0248466 A1 | 9/2015 | Jernigan, IV et al. |
| 2015/0261776 A1 | 9/2015 | Attarde et al. |
| 2015/0269032 A1 | 9/2015 | Muthyala et al. |
| 2015/0278104 A1 | 10/2015 | Moon et al. |
| 2015/0347306 A1 | 12/2015 | Gschwind |
| 2015/0378839 A1 | 12/2015 | Langouev et al. |
| 2016/0026405 A1 | 1/2016 | Dhuse |
| 2016/0041880 A1 | 2/2016 | Mitkar et al. |
| 2016/0042090 A1 | 2/2016 | Mitkar et al. |
| 2016/0062846 A1 | 3/2016 | Nallathambi et al. |
| 2016/0065671 A1 | 3/2016 | Nallathambi et al. |
| 2016/0139836 A1 | 5/2016 | Nallathambi et al. |
| 2016/0142483 A1 | 5/2016 | Nallathambi et al. |
| 2016/0154709 A1 | 6/2016 | Mitkar et al. |
| 2016/0170657 A1 | 6/2016 | Suehr et al. |
| 2016/0188416 A1 | 6/2016 | Muller et al. |
| 2016/0196070 A1 | 7/2016 | Vijayan et al. |
| 2016/0266980 A1 | 9/2016 | Muller et al. |
| 2016/0267159 A1 | 9/2016 | Muller et al. |
| 2016/0299818 A1 | 10/2016 | Vijayan et al. |
| 2016/0306707 A1 | 10/2016 | Vijayan et al. |
| 2016/0306708 A1 | 10/2016 | Prahlad et al. |
| 2016/0306818 A1 | 10/2016 | Vijayan et al. |
| 2016/0350391 A1 | 12/2016 | Vijayan et al. |
| 2017/0031768 A1 | 2/2017 | Sarab |
| 2017/0083558 A1 | 3/2017 | Vijayan et al. |
| 2017/0083563 A1 | 3/2017 | Vijayan et al. |
| 2017/0090773 A1 | 3/2017 | Vijayan et al. |
| 2017/0090786 A1 | 3/2017 | Parab et al. |
| 2017/0124108 A1 | 5/2017 | Mitkar et al. |
| 2017/0168903 A1 | 5/2017 | Dornemann et al. |
| 2017/0177271 A1 | 6/2017 | Vijayan et al. |
| 2017/0185488 A1 | 6/2017 | Kumarasamy et al. |
| 2017/0192860 A1 | 7/2017 | Vijayan et al. |
| 2017/0192861 A1 | 7/2017 | Vijayan et al. |
| 2017/0192866 A1 | 7/2017 | Vijayan et al. |
| 2017/0192867 A1 | 7/2017 | Vijayan et al. |
| 2017/0192868 A1 | 7/2017 | Vijayan et al. |
| 2017/0193003 A1 | 7/2017 | Vijayan et al. |
| 2017/0199699 A1 | 7/2017 | Vijayan et al. |
| 2017/0206219 A1 | 7/2017 | Vijayan et al. |
| 2017/0235647 A1 | 8/2017 | Kilaru et al. |
| 2017/0242871 A1 | 8/2017 | Kilaru et al. |
| 2017/0315876 A1 | 11/2017 | Dornquast et al. |
| 2018/0189314 A1 | 7/2018 | Mitkar et al. |
| 2019/0012237 A1 | 1/2019 | Prahlad et al. |
| 2019/0012328 A1 | 1/2019 | Attarde et al. |
| 2019/0026305 A1 | 1/2019 | Vijayan et al. |
| 2019/0188088 A1 | 6/2019 | Muller et al. |
| 2019/0205290 A1 | 7/2019 | Vijayan et al. |
| 2019/0272220 A1 | 9/2019 | Vijayan et al. |
| 2019/0272221 A1 | 9/2019 | Vijayan et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 1995/013580 | 5/1995 |
| WO | WO 99/009480 A1 | 2/1999 |
| WO | WO 1999/012098 | 3/1999 |
| WO | WO 2002/005466 | 1/2002 |
| WO | WO 2006/052872 | 5/2006 |
| WO | WO 2010/013292 A1 | 2/2010 |
| WO | WO 2010/140264 | 12/2010 |

(56) References Cited

FOREIGN PATENT DOCUMENTS

| WO | WO 2012/044366 | 4/2012 |
|---|---|---|
| WO | WO 2012/044367 | 4/2012 |
| WO | WO 2013/188550 | 12/2013 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Bhagwat, Extreme Binning: Scalable, Parallel Deduplication for Chunk-based File Backup. IEEE 2009, 9 pages.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Cohen, Edith, et al., "The Age Penalty and Its Effect on Cache Performance." In USITS, pp. 73-84. 2001.

Cohen, Edith, et al., Aging through cascaded caches: Performance issues in the distribution of web content. In ACM SIGCOMM Computer Communication Review, vol. 31, No. 4, pp. 41-53. ACM, 2001.

Cohen, Edith, et al., "Refreshment policies for web content caches." Computer Networks 38.6 (2002): 795-808.

CommVault Systems, Inc. "Continuous Data Replicator 7.0," Product Data Sheet, 2007.

CommVault Systems, Inc., "Deduplication—How to," http://documentation.commvault.com/commvault/release_8_0_0/books_online_1/english_US/features/single_instance/single_instance_how_to.htm, internet accessed on Jan. 26, 2009, 7 pages.

CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.

Diligent Technologies HyperFactor, http://www.dilligent.com/products:protecTIER-1:HyperFactor-1, Internet accessed on Dec. 5, 2008, 2 pages.

Dubnicki, et al. "HYDRAstor: A Scalable Secondary Storage." FAST. vol. 9.2009, 74 pages.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Jander, "Launching Storage-Area Net," Data Communications, US, McGraw Hill, NY, vol. 27, No. 4(Mar. 21, 1998), pp. 64-72.

Kornblum, Jesse, "Identifying Almost Identical Files Using Context Triggered Piecewise Hashing," www.sciencedirect.com, Digital Investigation 3S (2006), pp. S91-S97.

Lortu Software Development, "Kondar Technology—Deduplication," http://www.lortu.com/en/deduplication.asp, Internet accessed on Dec. 5, 2008, 3 pages.

Overland Storage, "Data Deduplication," http://www.overlandstorage.com/topics/data_deduplication.html, Internet accessed on Dec. 5, 2008, 2 pages.

Quantum Corporation, "Data De-Duplication Background: A Technical White Paper," May 2008, 13 pages.

Rosenblum et al., "The Design and Implementation of a Log-Structure File System," Operating Systems Review SIGOPS, vol. 25, No. 5, New York, US, pp. 1-15 (May 1991).

Wei, et al. "MAD2: A scalable high-throughput exact deduplication approach for network backup services." Mass Storage Systems and Technologies (MSST), 2010 IEEE 26th Symposium on. IEEE, 2010, 14 pages.

Wolman et al., On the scale and performance of cooperative Web proxy caching, 1999.

Wu, et al., Load Balancing and Hot Spot Relief for Hash Routing among a Collection of Proxy Caches, 1999.

International Search Report and Written Opinion, International Application No. PCT/US2009/58137, dated Dec. 23, 2009, 14 pages.

International Search Report and Written Opinion, International Application No. PCT/US2011/030804, dated Jun. 9, 2011.

International Search Report and Written Opinion, International Application No. PCT/US2011/030814, dated Jun. 9, 2011.

International Search Report and Written Opinion, International Application No. PCT/US2013/045443 dated Nov. 14, 2013, 16 pages.

International Preliminary Report on Patentability, International Application No. PCT/US2013/045443 dated Dec. 16, 2014 11 pages.

Ashton, et al., "Two Decades of policy-based storage management for the IBM mainframe computer", www.research.ibm.com, 19 pages, published Apr. 10, 2003, printed Jan. 3, 2009, www.research.ibm.com, Apr. 10, 2003, pp. 19.

Gray (#2 of 2, pp. 604-609), Jim; Reuter Andreas, Transaction Processing Concepts and Techniques, Morgan Kaufmann Publisher, USA 1994, pp. 604-609.

Guo et al., Building a High-performance Deduplication System, Jun. 15, 2011, retrieved from the Internet at <URL: http://dl.acm.org/citation.cfm?id=2002206>, pp. 1-14.

Huff, KL, "Data Set Usage Sequence Number," IBM Technical Disclosure Bulletin, vol. 24, No. 5, Oct. 1981 New York, US, pp. 2404-2406.

Kashyap, et al., "Professional Services Automation: A knowledge Management approach using LSI and Domain specific Ontologies", FLAIRS-01 Proceedings, 2001, pp. 300-302.

Final Office Action for Japanese Application No. 2003531581, dated Mar. 24, 2009, 6 pages.

SYNCHRONIZED DATA DEDUPLICATION

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Technical Field

The present invention generally relates to data deduplication, and more particularly, some embodiments relate to systems and methods for facilitating shared deduplication information.

Description of the Related Art

The storage and retrieval of data is an age-old art that has evolved as methods for processing and using data have evolved. In the early 18th century, Basile Bouchon is purported to have used a perforated paper loop to store patterns used for printing cloth. In the mechanical arts, similar technology in the form of punch cards and punch tape were also used in the 18th century in textile mills to control mechanized looms. Two centuries later, early computers also used punch cards and paper punch tape to store data and to input programs.

However, punch cards were not the only storage mechanism available in the mid-20th century. Drum memory was widely used in the 1950s and 1960s with capacities approaching about 10 kb, and the first hard drive was developed in the 1950s and is reported to have used 50 24-inch discs to achieve a total capacity of almost 5 MB. However, these were large and costly systems and although punch cards were inconvenient, their lower cost contributed to their longevity as a viable alternative.

In 1980 the hard drive broke the 1 GB capacity mark with the introduction of the IBM 3380, which could store more than two gigabytes of data. The IBM 3380, however, was about as large as a refrigerator, weighed ¼ ton, and cost in the range of approximately $97,000 to $142,000, depending on the features selected. This is in stark contrast to contemporary storage systems that provide for storage of hundreds of terabytes of data or more for seemingly instantaneous access by networked devices. Even handheld electronic devices such as digital cameras, MP3 players and others are capable of storing gigabytes of data, and today's desktop computers boast hundreds of gigabytes of storage capacity.

However, with the advent of networked computing, storage of electronic data has migrated from the individual computer to network-accessible storage devices. These include, for example, optical libraries, Redundant Arrays of Inexpensive Disks (RAID), CD-ROM jukeboxes, drive pools and other mass storage technologies. These storage devices are accessible to and can be shared by individual computers such as via a Local Area Network (LAN), a Wide Area Network (WAN), or a Storage Area Network (SAN) to name a few. These client computers not only access their own local storage devices but also storage devices of the network to perform backups, transaction processing, file sharing, and other storage-related operations.

The large volumes of data often stored and shared by networked devices can cause overloading of the limited network bandwidth. For example, during operations such as system backups, transaction processing, file copying and transfer, and other similar operations, the communication bandwidth of the network often becomes the rate-determining factor.

In addition, even with large capacity storage systems, computing enterprises are being overloaded by vast amounts of data. Documents sent via email, for example, can be copied and resent multiple times and several instances of the very same document might be stored many times in many different locations. IT administrators are struggling to keep up with the seemingly exponential increase in the volume of documents, media and other data. This problem is severely compounded by other factors such as the large file sizes often associated with multi-media files, and file proliferation through email and other content sharing mechanisms. However, additional storage capacity requires capital expenditures, consumes power, takes up floor space and burdens administrative overhead. Even with additional storage capacity, the sheer volume of data becomes a strain on backup and data recovery plans, leading to greater risk in data integrity.

As an alternative to simply increasing the amount of storage capacity, contemporary enterprises have turned to compression and other like technologies to reduce the volume of data. One such technology that can be used is known as data deduplication. Data deduplication in its various forms eliminates or reduces the amount of redundant data by implementing policies that strive to reduce the quantity of, or even eliminate, instances of redundant data blocks in storage. With data deduplication, data is broken up into segments or blocks. As new data enters the system, the segments are checked to see if they already exist in storage. If a segment already exists, rather than store that segment again, a pointer to the location of the existing segment is stored.

The segment size selected for data deduplication can be defined at various levels, from small segment sizes (for example, 1 kB or less) to much larger segment sizes, and to entire files. A larger segment size can yield greater space or bandwidth savings on a per-instance basis, however, the opportunities for identifying redundancies may be reduced with larger segment sizes. These tradeoffs can depend on the system with which deduplication is implemented and the types of data or files it handles.

As indicated above, in some instances, deduplication can be performed on a file-by-file basis. With such a system, rather than storing multiple copies of the same file, one instance of the file is stored, for example, in a central repository, and pointers to the file are stored in place of the redundant copies. However, deduplication at the file level can suffer in efficiencies as compared to deduplication using smaller segment sizes because even a small change in the file generally requires that an entire copy of the file be re-stored.

In addition to reducing the amount of storage space consumed, data deduplication can also help to relieve congestion on crowded communication pathways. In addition, the more efficient use of disk space can often allow data retention periods to increase, adding more integrity to the enterprise. Data deduplication is frequently used in conjunction with other forms of data reduction, including conventional data compression algorithms and delta difference storage.

Data deduplication often relies on hashing algorithms that hash the data segments to generate an identifying signature for the segments. Accordingly, each segment is processed using the hashing algorithm to generate a hash value. The resultant hash value is compared against hash values stored in a hash table to determine whether the segment already exists. If so, the segment is replaced with a pointer to the entry in the table containing the appropriate hash value or pointing to the location of the data in storage. Otherwise, the new data is stored and its hash value is added to the table along with an address for the data.

Because hash functions are not perfect, the same hash value can in some cases be returned for segments containing different data. When such a false-positive occurs, the system can mistake new data for already-stored data and fail to store the new segment. Accordingly, multiple hash algorithms and other techniques can be employed to reduce the likelihood of these so-called hash collisions.

BRIEF SUMMARY OF EMBODIMENTS OF THE INVENTION

According to various embodiments, systems and methods are provided for data deduplication. Particularly, in some embodiments, techniques for performing reference table distribution and synchronization are provided. Accordingly, a reference table generated as a result of the deduplication process at a storage repository can be shared among a plurality of client systems that utilize a repository for data storage. This can be implemented to allow the client systems to perform local data deduplication before their data is sent to the repository. Likewise, this can also allow the client systems to receive deduplicated data from the storage repository. Accordingly, systems and methods can be implemented to allow deduplicated data to be transferred among a plurality of computing systems thereby reducing bandwidth requirements for data storage and retrieval operations.

In some embodiments, rather than distribute the entire reference table to each client for synchronization, a proper subset of reference table entries can be identified and shared with the client devices for synchronization. This can be implemented so as to reduce the amount of bandwidth required to synchronize the reference table among the computing systems. In further embodiments, the subset can be identified based on data utilization criteria.

According to an embodiment of the invention, systems and methods are provided for performing data deduplication for data used by a plurality of computing systems. The systems and methods can be configured to perform the steps of receiving at a shared storage repository data from the plurality of computing systems, performing a data deduplication operation on the received data, and transmitting an instantiation of a reference table for the deduplication to determined ones of the plurality of computing systems to allow deduplication to be performed by the determined ones of the plurality of computing systems.

The deduplication operation can include defining a segment of the received data; applying an algorithm to the defined data segment to generate a signature for the defined data segment; comparing the signature for the defined data segment with one or more signatures stored in a reference table for one or more previously defined data segments to determine whether the defined segment is already stored in the shared storage repository; and updating the reference table to include the signature for the defined data segment and a reference for the defined data segment if the defined data segment is not in the shared storage repository.

In one embodiment, a first instantiation of the reference table is sent to a first group of one or more of the plurality of computing systems and a second instantiation of the reference table is sent to a second group of one or more of the plurality of computing systems, wherein the first instantiation of the reference table is different from the second instantiation of the reference table.

The operation can further include a step of determining the instantiation of the reference table to be transmitted, and wherein the instantiation of the reference table is a proper subset of the reference table. The step of determining the instantiation of the reference table can include selecting one or more entries of the reference table based on at least one of utilization rate of data segments represented by the entries and size of the data segments represented by the entries. In another embodiment, the step of determining the instantiation of the reference table comprises selecting one or more entries of the reference table based on a combination of utilization rate of data segments represented by the entries and size of the data segments represented by the entries. Any of a number of combinations can be used. For example, the combination can be a weighted combination of utilization rate of data segments represented by the entries and size of the data segments represented by the entries.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
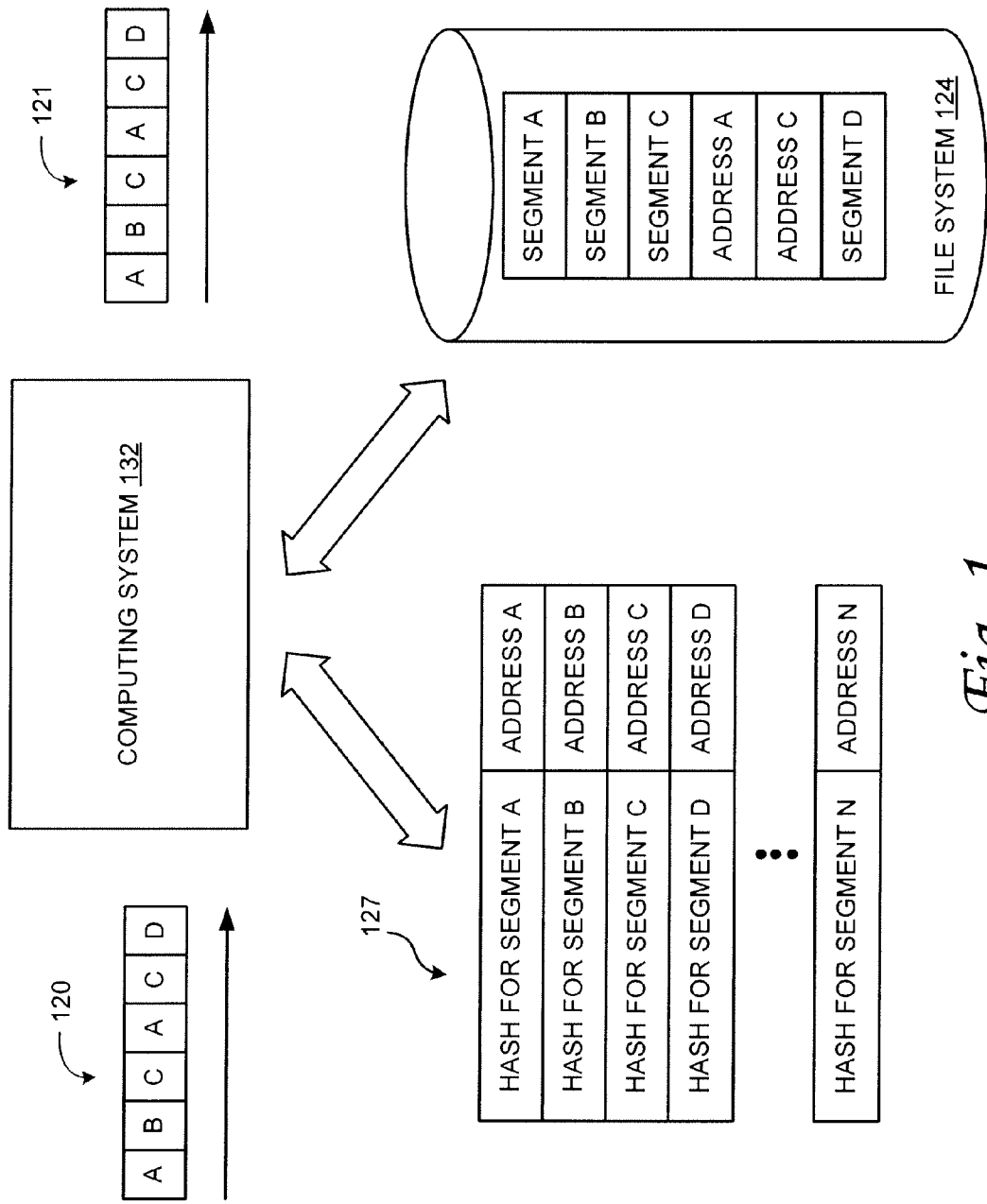
FIG. 1 is a diagram illustrating an example process for data deduplication in accordance with various embodiments.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for data deduplication, and more particularly various embodiments are directed toward systems and methods for synchronization of reference tables to facilitate data deduplication. In various embodiments, data is stored for a plurality of clients in a shared storage environment, and rather than transfer large amounts of data among the clients and the shared storage, the data in shared storage is deduplicated and the hash table or other reference table for the data is shared among some or all of the clients. When a client has data to transfer to or place in the shared storage, that client can run a deduplication algorithm on segments of the data and use its own representative instantiation of the reference table to determine whether the data segments already exist in a shared data store. Accordingly, for a given segment, the client can determine whether to send the entire data segment to the shared storage or just send a reference or pointer or other information from the reference table if the segment is duplicative of what is already in the data store. In a situation where the analyzed segment is not in the data store, the client device can send the hash value or other reference table information to the central storage (or other location maintaining the main reference table) so that the primary reference table can be updated with the information on the newly added segment.

In various embodiments, the data store or shared storage repository can comprise any of a number of data storage architectures. For example, in one application, the shared storage can comprise one or more data storage systems accessible by and shared among multiple client systems such as, for example, one or more dedicated storage repositories or centralized storage repositories. In another example, the shared storage repository can comprise a plurality of storage locations distributed across some or all of the multiple clients among which the data is shared, or a combination of distributed and centralized storage devices.

In further embodiments of the invention, rather than send an entire reference table to each of the clients or client groups that are sharing the common storage, a subset of the table can be identified and only that subset is transmitted to the client systems to synchronize the reference tables among all of the devices. Additionally, different client systems or groups of client systems can receive different subsets of the reference table. Subsets can be defined for a given client or group of clients based on data utilization or other factors. Transferring a subset of the reference table rather than the entire reference table can reduce bandwidth consumption across the network, result in increased efficiency and reduce synchronization problems with the database.

For clarification, in the various embodiments described herein, the term synchronization is not intended to require that all client devices be updated with a representative instantiation of the reference table at the same time or that all client devices receive the same reference table. Although in some embodiments the reference table or updates thereto can be broadcast to all participating systems simultaneously (or close to simultaneously), in other embodiments the reference table or its updates can be sent to different client devices or groups of client devices at different times. Likewise, in some embodiments the same reference table, or the same subset can be sent to all clients. However, in other embodiments, subsets can be tailored for a given client or group of clients.

Before describing the invention in detail, it is useful to describe a few example environments with which the invention can be implemented. One such example is that of a straightforward data deduplication algorithm with which the systems and methods described herein can be implemented. FIG. 1 is a diagram illustrating an example process for data deduplication in accordance with various embodiments. It will be appreciated after reading the description provided herein that the various embodiments of the invention not limited to applicability with this example data deduplication process, but can be implemented with any of a variety of forms of data deduplication.

Referring now to FIG. 1, the illustrated example assumes an incoming data stream 120. For purposes of deduplication, the data stream can be segmented into a plurality of preferably equal-length segments. For example, in some embodiments, the data is broken up into segments that are 128 kB in length. In the illustrated example, incoming data stream 120 includes the segments A, B, C, A, C and D in that order. To perform the data deduplication, the computing system 132 receives the data, segments the data, and runs a hash function or other signature generation algorithm against each segment. The computing system 132 checks the resultant hash value for a given segment with hash values stored in hash table 127. If the resultant hash value does not match a hash value already stored, this indicates that the segment is a new segment of data. In this case, this new segment of data is written into file system 124, its hash value is added to hash table 127 as is a pointer to its address in the file system 124.

On the other hand, if the resultant hash value for a given segment already exists in the hash table 127, this indicates that the same data sequence in that segment is already stored in file system 124. Accordingly, rather than storing the entire segment in the file, only the pointer or address to the same segment that was previously stored needs to be retained. Following this methodology for data stream 120 results in the example file 129 illustrated as being stored in file system 124. This example file includes the first instances of segments A, B, C and D. However, for the subsequent instances of segments A and C that occurred in the incoming data stream 120, the file includes a pointer to the originally stored segments A and C. This is illustrated by ADDRESS A and ADDRESS C in file system 124.

To re-create the original data stream, segments are retrieved from file system 124 and assembled in order. Where an address exists in place of the actual data elements of the segment (ADDRESS A and ADDRESS C in the instant example), that address is accessed, the data retrieved and packaged into the reassembled data stream. In this example, resultant data stream 121 contains the same data as existed in original data stream 120.

Although the illustrated example depicts a system that utilizes a simple reference table having a hash value and pointer value for each segment, more complex systems can also make up an environment for the systems and methods described herein. For example, for the hash values the reference table can also include the source or sources of the data segment represented by the hash, a counter of the number of times that a given segment is encountered, the location of where the segments occur on client devices, and so on. As such, the reference table can be implemented as a hybrid of a hash table and a file allocation table (FAT). This can be useful as a backup in the event that a client system crashes or otherwise goes off line.

The above example is described in terms of an individual computing system (having one or more computing devices) performing local data deduplication for local data storage using a hash function. Data deduplication can also be performed for a plurality of computing systems using shared or local data storage or a combination thereof. For example, the data segments need not be stored at a central location such as file system 124 but can be stored at one or more client locations or at a combination of client locations and central storage locations. Accordingly, the pointers or addresses stored in the reference table can point to the actual storage location of the referenced segment whether that location be at a client storage location or in a central storage repository.

In addition, techniques other than hash functions can be used for data deduplication. Other algorithms can be used to generate a signature for the blocks of data. Likewise, other deduplication methods can also be used to identify redundancies or duplicate entries. Accordingly, the terms hash table, signature table, or reference table might be used in this document interchangeably to refer to the table, index, or other like mechanism used to track the data deduplication process, regardless of the actual file structure and regardless of the function used to arrive at the signatures.

Figure 2:
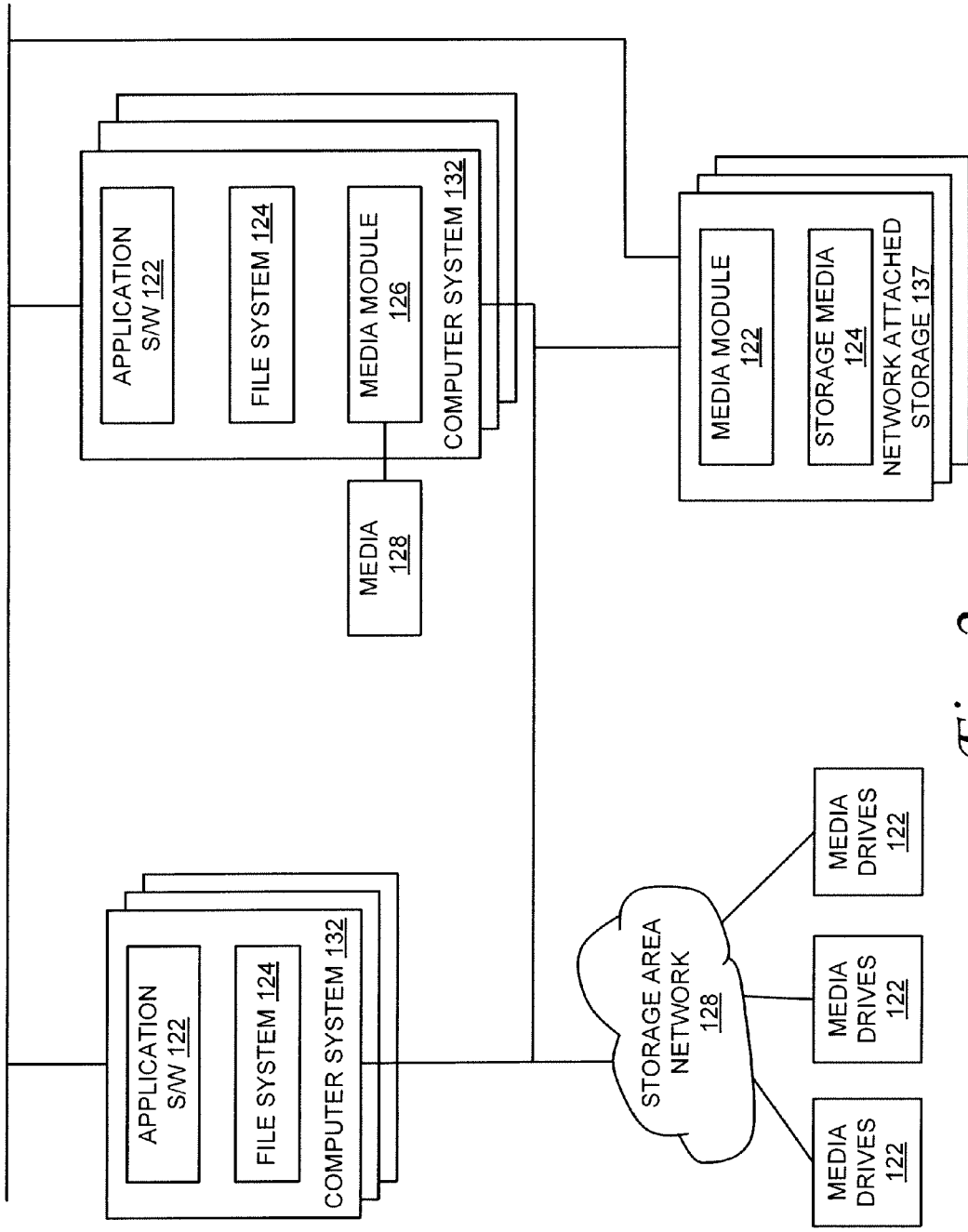
FIG. 2 is a diagram illustrating an example environment in which data from multiple computing systems is stored in one or more shared storage facilities.

As illustrated in the example of FIG. 1, data deduplication can be implemented with a single or small computing system using local data storage. In other examples data deduplication can be implemented for data communications as well as for environments where information storage is at a centralized or other shared location, or spread across storage devices associated with multiple computing systems. FIG. 2 is a diagram illustrating an example environment in which data from multiple computing systems is stored in one or more shared storage facilities. Referring now to FIG. 2, the illustrated example includes a plurality of computer systems 132 connected via one or more networks 147, 149 to two network-accessible storage facilities. These storage facilities in this example include a storage area network 128 and a network attached storage facility 137. Networks 147, 149 can be implemented utilizing any of a number of network technologies or topologies. The physical layer can include, for example fiber, copper, or wireless communication channels.

In this example, storage area network 128 can include a plurality of data storage devices 122 to provide sufficient quantities of data storage for the networked computing systems 132. For example, hard disk drives, disk arrays, optical storage drives and other high-volume memory or storage devices can be included with storage area network 128 to provide desired amounts of data storage at specified access speeds. Similarly, network attached storage can include any variety of data storage devices 122 to provide sufficient quantities of data storage at desired access speeds. Illustrated in this example, network attached storage 137 includes removable storage media 124, although fixed media can also be used. Likewise, data storage 122 associated with storage area network 128 can also use fixed or removable media.

Computing systems 132 connected to networks 147, 149 typically include application software 122 to perform desired operations. Although not illustrated, computing systems 132 typically also include an operating system on which the application software 122 runs. The file system 124 can be provided to facilitate and control file access by the operating system and application software 122. File systems 122 can facilitate access to local and remote storage devices for file or data access and storage. As also illustrated, computer systems 132 can include local storage such as a media module media drive 126 with fixed or removable media 136.

Figure 3:
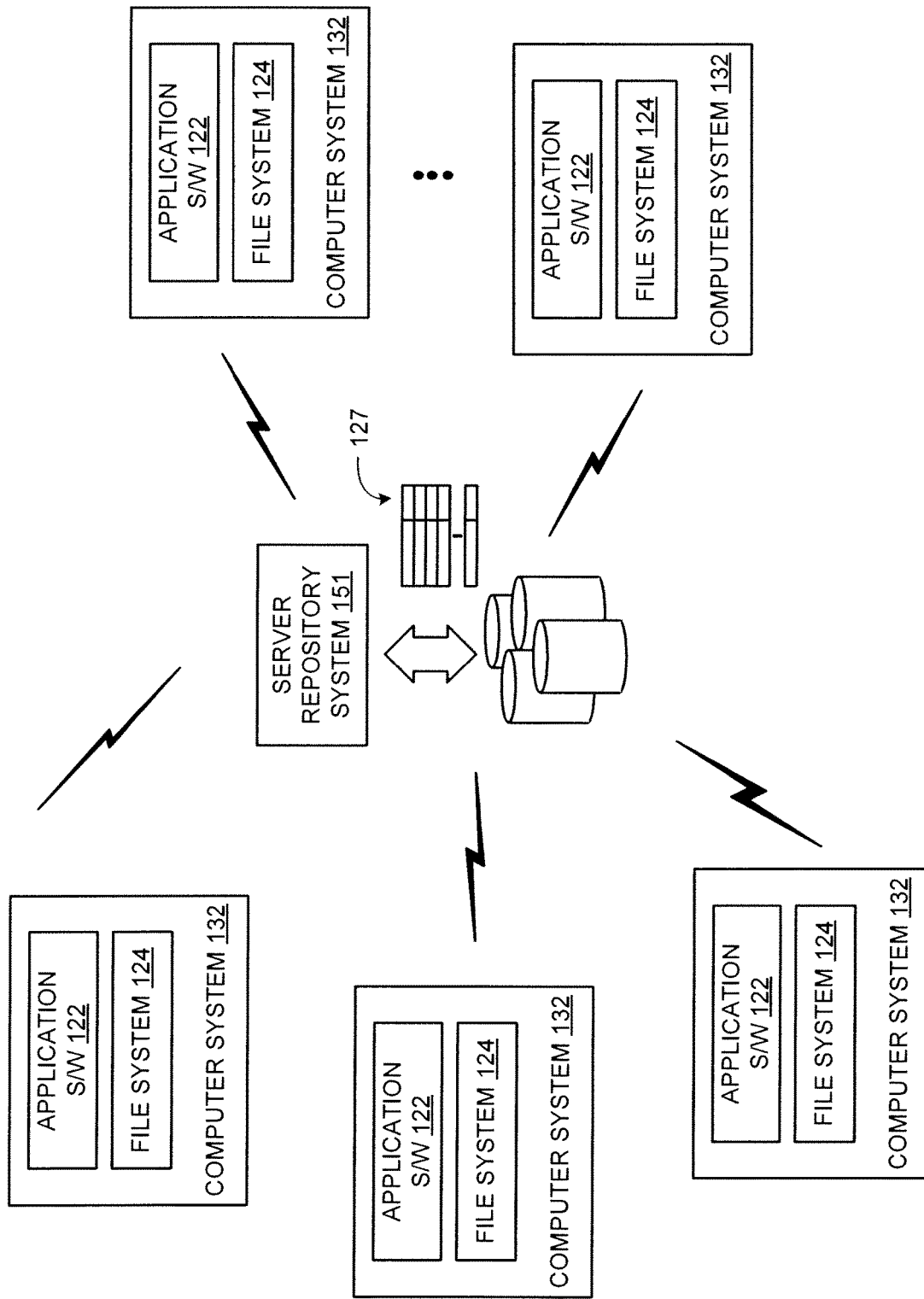
FIG. 3 is a simplified block diagram illustrating another example environment with which embodiments of the invention can be implemented.

FIG. 3 is a simplified block diagram illustrating another example environment with which embodiments of the invention can be implemented. In the example illustrated in FIG. 3, a plurality of computer systems 132 rely on a centralized server repository system 151 for data storage. In such an environment, computing systems 132 may retain some level of local data storage but may also rely on repository system 151 for larger-volume data storage. In such environments, computer systems 132 can transfer data files and the like to repository system 151 for storage via, for example, a communication network. Preferably, to reduce the volume of storage at repository system 151, data deduplication can be performed on data items that are received for storage using any of a number of different data deduplication techniques.

In one example, as data is received from a computer system 132 for storage, repository system 151 performs the data deduplication in an in-line or post-processing methodology for storage. For example, in terms of the exemplary deduplication methodology described above with respect to FIG. 1, repository system 151 can break up the received data into a plurality of data segments or chunks; hash or otherwise process the bit patterns in each segment to generate a hash value or other signature; and compare the signature value of the newly received segment to signatures already stored in table 127. If the signature value already exists in table 127, this indicates the same bit sequence is already in the data storage and accordingly, the pointer to that segment is retrieved from table 127 and inserted in the file in place of that segment. The reference table 127 can be updated to include information reflecting this instance of the data segment. For example, a reference counter for the signature value can be incremented, the source of this instance of the data segment can be added to the table, the location of where the segment existed on the client can be added and so on.

If, on the other hand, the signature value does not already exist in table 127, the bit sequence is not in data storage. In such a case, this segment is placed into storage and the signature is placed in a new entry in table 127 along with a pointer to the storage location of the new segment. The reference table 127 can also include additional information reflecting information about the data segment such as, for example, the source of this first instance of the data segment, the location of where the segment existed on the client, and a reference counter indicating the number of times the segment was encountered.

As the example of FIG. 3 illustrates, in environments where data is stored and deduplicated at a centralized repository, large volumes of data that have not been deduplicated might still be stored or utilized locally and communicated across the network or other communication channels between the clients and the repository. The same scenario can hold true with other environments including the example illustrated in FIG. 2. Accordingly, in various embodiments, the hash table or other like reference table can be shared among the various computer systems 132 so that synchronized deduplication can be performed. This can be accomplished by sending an instantiation of the reference table to the client devices 132. This instantiation can be the entire reference table itself, or a subset of the reference table.

Sharing the reference table with the client computing systems 132 allows the client systems 132 to deduplicate the data before it is passed to repository system 151 for storage. Further, this can allow the client systems 132 to consider segments already stored in the repository system 151 when doing their local deduplication. With such an arrangement, and assuming again the example duplication process described above with respect to FIG. 1, a client system 132 can segment its data, hash the data to obtain a signature, and compare the obtain signature with the signatures in its local hash table. If the signature already exists, this indicates that the segment already exists in storage, assuming it is not a false positive. Accordingly, rather than transmit the entire segment to the repository system 141, client computing system 132 can retrieve the designated pointer for the signature from its local table and pass that pointer along in place of the data.

For large networks or other large computing environments, the hash table or other reference table 127 can grow to be quite large. Where this is the case, a substantial amount of bandwidth can be consumed by synchronizing the reference table 127 amongst repository system 151 and the various client computing systems 132. This situation can be compounded where large amounts of data are being stored by a large number of computing systems 132. In addition, as the repository is pruned, further reference-table synchronization opportunities are presented, leading to additional bandwidth consumption. Accordingly, embodiments can be implemented wherein a proper subset or portion of the reference table 127 is shared among the multiple computing systems to reduce, minimize or avoid sending the entire reference table 127 to the various systems for synchronization. For example, in one implementation, an entire reference table 127 can be sent to the client devices initially, and updates to synchronize the table to account for ongoing changes can be done by sending a proper subset containing less than the entire original table. As another example, in another embodiment, a proper subset is defined and sent initially rather than sending the entire table. Then, updates to the subset are made on an ongoing basis.

Figure 4:
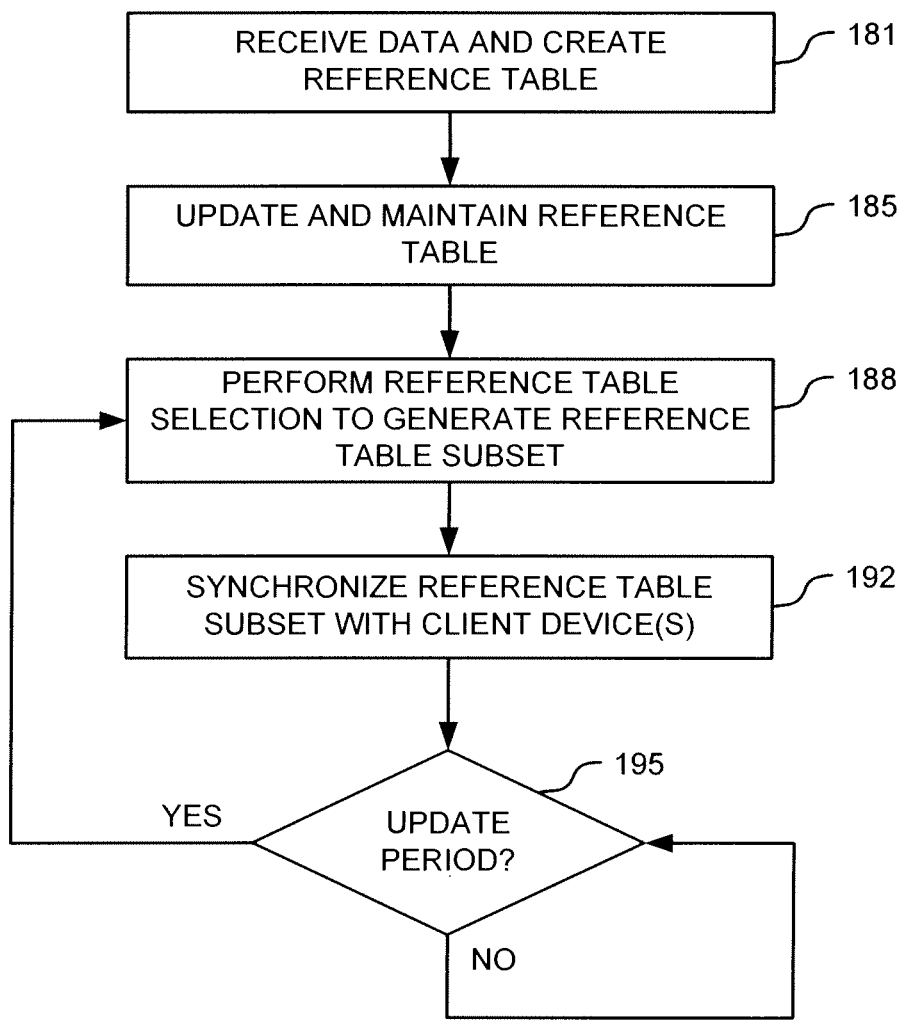
FIG. 4 is a diagram illustrating an example process for reference table synchronization in accordance with one embodiment of the invention.

FIG. 4 is a diagram illustrating an example process for reference table synchronization in accordance with one embodiment of the invention. This example is described with reference to the exemplary environment of FIG. 3 and assumes the exemplary data deduplication process described above with reference to FIG. 1. Description of this and other embodiments in terms of this exemplary environment an exemplary data deduplication process is made for ease of discussion purposes only. After reading these descriptions, one of ordinary skill will understand how the various embodiments described herein can be used in other data storage and communication environments and with other deduplication algorithms or processes.

Referring now to FIG. 4, in step 181 data for deduplication and storage IS received. In terms of the exemplary environments described above, data can be received from a client device 132 by storage repository 151 for storage. Storage repository 151 deduplicates the data, creating a reference table in the process. For example, in terms of the example described above with respect to FIG. 1, storage repository 151 segments of data, hashes each segment to create a hash value signature, and compares the signature to existing entries in the reference table 127. Accordingly, a result of step 181 is storage of deduplicated data and creation of the reference table (such as, for example a hash table 127).

As illustrated at step 185, as additional data is received by storage repository 151 and other data removed from storage repository 151, the reference table is updated and maintained by storage repository 151. For example, new entries to the reference table are made to include signatures and pointers for new data segments received and old signatures and pointers are removed from the table as segments are deleted from the repository.

At step 188, the system performs reference table selection to identify a subset of entries in the reference table for streamlined reference-table-synchronization operations. Various algorithms or processes can be used to identify or define a subset of entries for streamlined synchronization. Generally, in one embodiment, algorithms are implemented to identify those data segments being stored in repository system 151 that have the highest utilization for highest likelihood of occurrence. In such an embodiment, synchronization of a relatively small portion of the reference table can result in bandwidth savings of a relatively larger proportion.

At step 192, the reference table is synchronized with one or more client devices 132. In the illustrated example, it is the subset identified in step 188 that is shared with (for example, sent to) client devices 132 to synchronize or update their local instances of the reference table. The process can continue through subsequent deduplication operations in which the reference table is updated with new entries, relevant subsets of the entries are identified in light of the changes to the reference table, and synchronization performed based on the reference table subset. This is indicated by step 195, which shows the reference-table subset generation and synchronization being performed on a periodic basis. In addition to adding new entries to the reference table for newly stored segments, updates to the reference table can also include updates to reference counter values, sources of data segments, and so on. In one embodiment, the synchronization operations can be run on a periodic basis based on temporal criteria such as the expiration of a period of time, or they can be triggered based on throughput metrics or other criteria. Examples of throughput criteria can include criteria such as, for example, the amount of new data stored in or removed from the system, the number of updates made to the reference table, and so on.

As indicated above with reference to step 188, one criteria that can be used to define the relevant subsets for reference table is based on data utilization. For example, in one embodiment, the system tracks not only the existence of a segment in the repository but also the utilization of each of the segments. One way in which utilization can be tracked is by tracking the quantity or frequency of occurrences of a given segment or the number of times it is accessed. The segments can be scored based on the utilization or access rates and ranked accordingly. This can be used in one embodiment to define or identify segments whose signatures will appear on the reference table subset.

As one example, the number of times that a given segment is presented to repository 151 for storage can be tracked by the system. This number can, in many applications, be directly proportional to the amount of communication bandwidth that is being consumed by transferring the segment from client devices 132 to storage repository 151. Accordingly, these higher utilization segments tend to have a larger impact on system bandwidth than segments within lower utilization. In such environments, defining the reference table subset based on utilization can allow a trade-off between to be made reference table size and marginal improvements in bandwidth savings. In other words, where a reference table for synchronization includes entries for infrequently used data segments, inclusion of these entries in the table for synchronization could consume more bandwidth than is saved by allowing these entries to be used for deduplication at the client side.

Another way to define a subset of the reference table for table synchronization can be to identify changes to the table since the last synchronization operation, such as new table entries or deletions. With changes identified, the system can be configured to send only those changes to the clients to update their local copies of the table. As noted above, in some embodiments not all clients are updated at the same time. Accordingly, changes to the reference table can be tracked on a client-by-client basis, or on the basis of groups of clients so that the updates can be managed based on the actual need of given clients.

Figure 5:
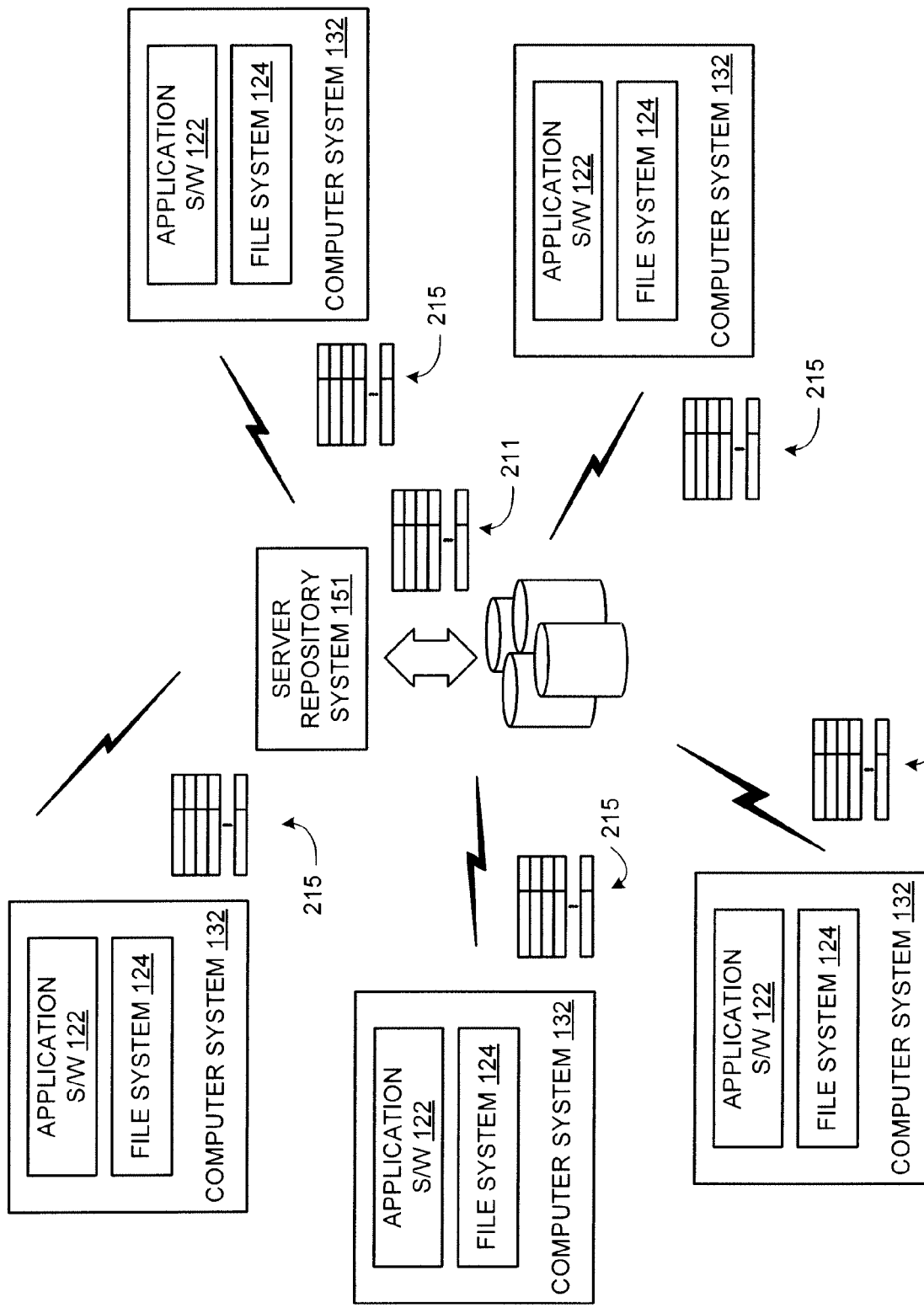
FIG. 5 is a diagram illustrating an example of reference table synchronization in accordance with one embodiment of the invention.

FIG. 5 is a diagram illustrating an example of reference table synchronization in accordance with one embodiment of the invention. Referring now to FIG. 5, in this example a reference table 211 is maintained in server repository system 151 for data deduplication purposes. Reference table 215 represents distribution of reference table 211 or portions thereof to the client computer systems 132. As indicated above, reference table 215 can be a subset of reference table 211 and can be updated using subsets identified for reference table 211 such as, for example, in accordance with the embodiment described above with reference to FIG. 4. In an optimized system, a trade-off is made between the number of entries of the subset reference table pushed to each client system 132 and the actual or anticipated bandwidth saved by the inclusion of each additional entry.

Figure 6:
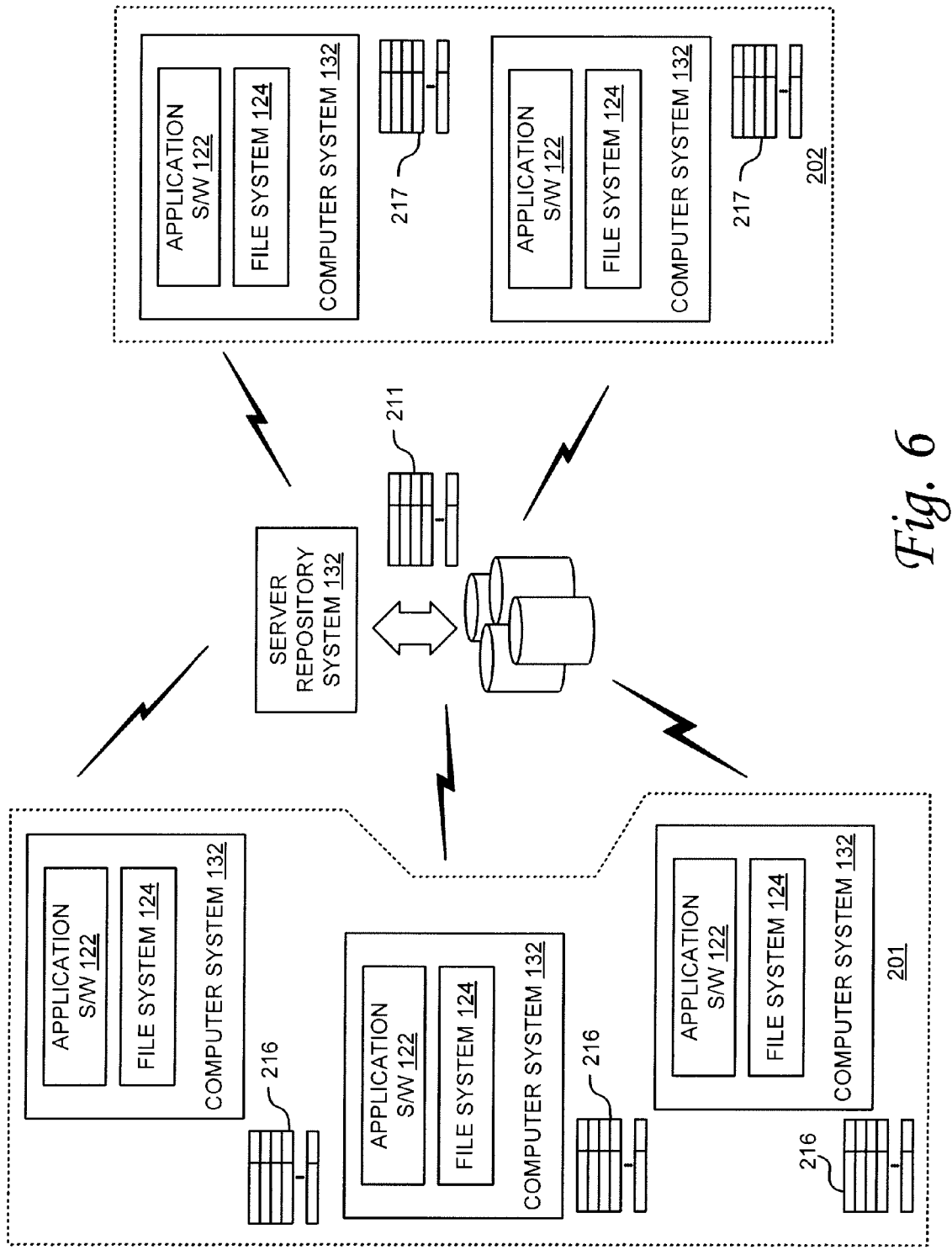
FIG. 6 is a diagram illustrating an example of client groupings for targeted reference table synchronization in accordance with one embodiment of the invention.

In various environments, the process might be further streamlined by defining the reference table subset differently for different clients or different groups of clients 132. Thus, for example, different subsets of reference table 211 can be sent to different computing devices resulting in some or all of the client devices 132 having a reference table that is different from other client devices 132. As another example, client devices 132 can be combined into groupings based on various characteristics (described below) and different subsets of reference table 211 can be sent to the different groupings of client devices. FIG. 6 is a diagram illustrating an example of client groupings for targeted reference table synchronization in accordance with one embodiment of the invention. Referring now to FIG. 6, client systems 132 are illustrated as being broken into two groupings 201, 202. This example also illustrates that two different reference tables 216, 217 are distributed to groupings 201, 202, respectively.

A number of factors or criteria can be considered when identifying targeted reference tables for a client and a group of clients. For example, the system can be configured to analyze the traffic received from each client or client grouping and perform client-specific utilization measurements. The most utilized entries can be identified on a client-by-client basis and the reference table subset identified accordingly. In another example, the reference table subsets for particular clients or groups of clients can be identified based on a number of other criteria including, for example, they size of the segments utilized by each of the clients, the type of processes being performed by each client, the client environment, characteristics of the client system, and so on. Each of these may have an effect on the quantity and type of data to be stored. As noted above, in some embodiments data in the reference table can be included to indicate the source of the data, its storage location, the number of occurrences and so on. Such data can be used in making the determination as to which clients or groups of clients will receive which subsets of the reference table.

As stated above, both segment size and utilization can be used as a metric to identify a subset of entries for the targeted reference tables for a client or group of clients. For example, in embodiments where stored segments can be of different sizes, selecting reference table data for larger segments would generally result in a greater gain in efficiencies than sharing reference data for smaller segments. Likewise, selecting reference table data for more frequently encountered segments generally results in a greater gain in efficiencies than sharing of reference data for infrequently used data. However, these generalizations are not always without exception. Consider for example a large segment of data that is very rarely used, or consider the opposite case of a smaller segment of data that is frequently utilized by a client or group of clients. In the first case, selecting the rarely used large segment for the subset may not yield the greatest gain in efficiencies. Therefore, a combination of factors, such as a combination of object size and utilization can be used to determine the subset of entries for synchronization.

Such a combination can be made, for example, by multiplying the size of an object by its utilization frequency. As another example such a combination can be made as a weighted combination of utilization frequency and object size. As a further illustration of this latter example, objects can be weighted by their size, with larger objects being weighted higher than smaller objects. Their weight can then be multiplied by their utilization frequency to rank them for subset selection. Weighting can be done on a sliding scale or it can be done in groupings based on data object sizes in the system. As an example of such a grouping, the top 20% of objects by size can be given a weighting of 100%, the next 20% by size a weighting of 80% and so on. As another example, size thresholds can be defined such that objects above a certain size threshold can be given a certain weighting. As a specific example of this, objects above 1 MB might be weighted 100%, objects between 750 kB and 1 MB weighted 90% and so on. As these examples illustrate, there are a number of specific implementations that can be used to define a subset based on a combination of factors such as block size and frequency of utilization.

Figure 7:
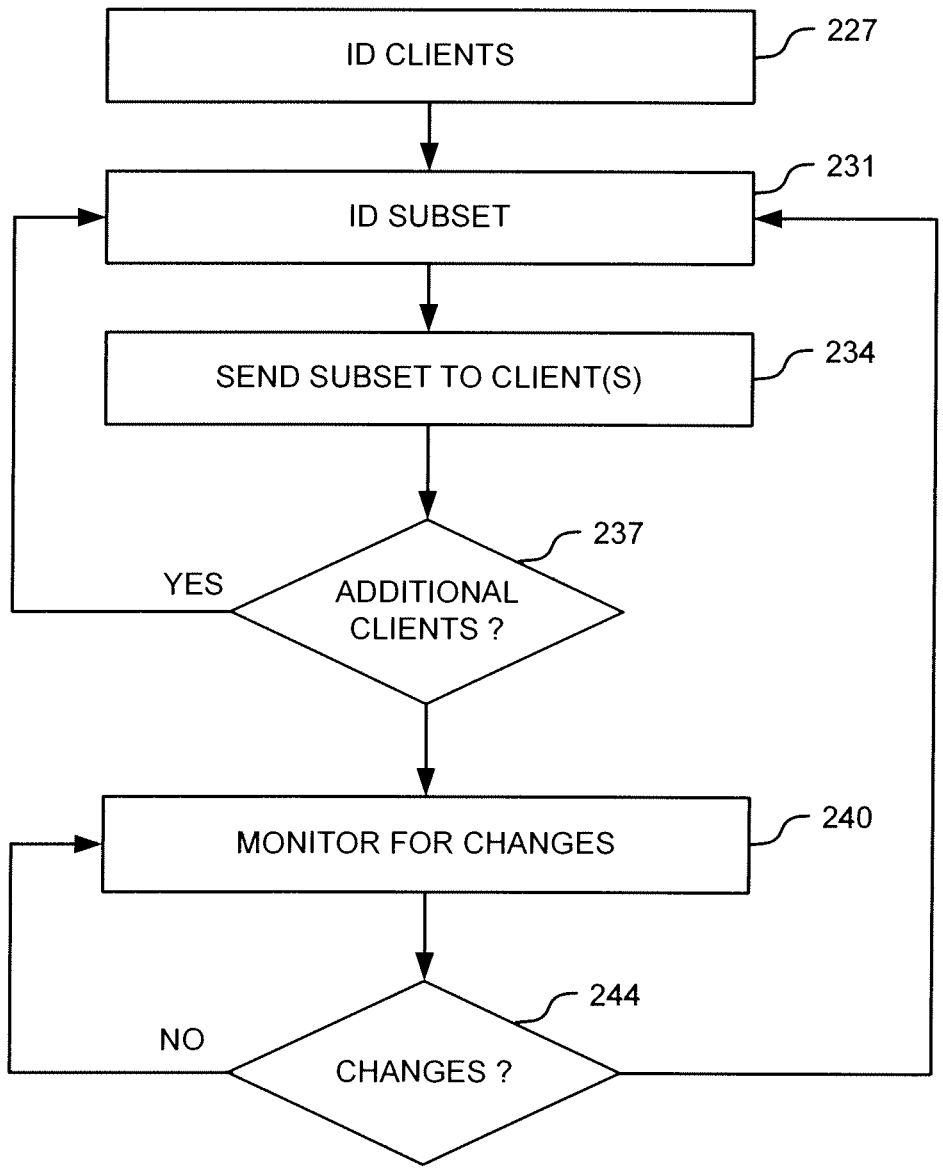
FIG. 7 is a diagram illustrating an example process for reference table subset updating for synchronization in accordance with one embodiment of the invention.

FIG. 7 is a diagram illustrating an example process for reference table subset updating in accordance with one embodiment of the invention. At step 227, client systems 132 that utilize repository system 151 can be identified. In embodiments where reference tables are targeted to particular clients or groups of clients, client characteristics can also be identified. At steps 231 and 234, a subset of the reference table is identified for a given client or client grouping and that subset is sent to that client or client group for synchronization. As illustrated by step 237, this process can be repeated for a plurality of clients or groups of clients.

At step 240, the reference table is monitored as data is received and deduplicated. The table is checked to determine whether changes are made to the reference table as a result of the new data. This check can also be made for data that is deleted from storage. This monitoring can be performed at the client side, the central repository, or at both locations. If changes are made, the process of identifying the subset and resynchronizing one or more of the clients with the new subset can be repeated as illustrated by step 244. In one example, the repository can receive data from a client, process and deduplicate the data for storage, and identify and send a representative hash table to the client for use in future storage operations. Because the data and hence the reference table can change over time, the subset can be re-defined and redistributed to the clients. As noted above, in one embodiment the subset is resent while in another embodiment only deltas to the subset are sent to the client to update the client's reference table.

Figure 8:
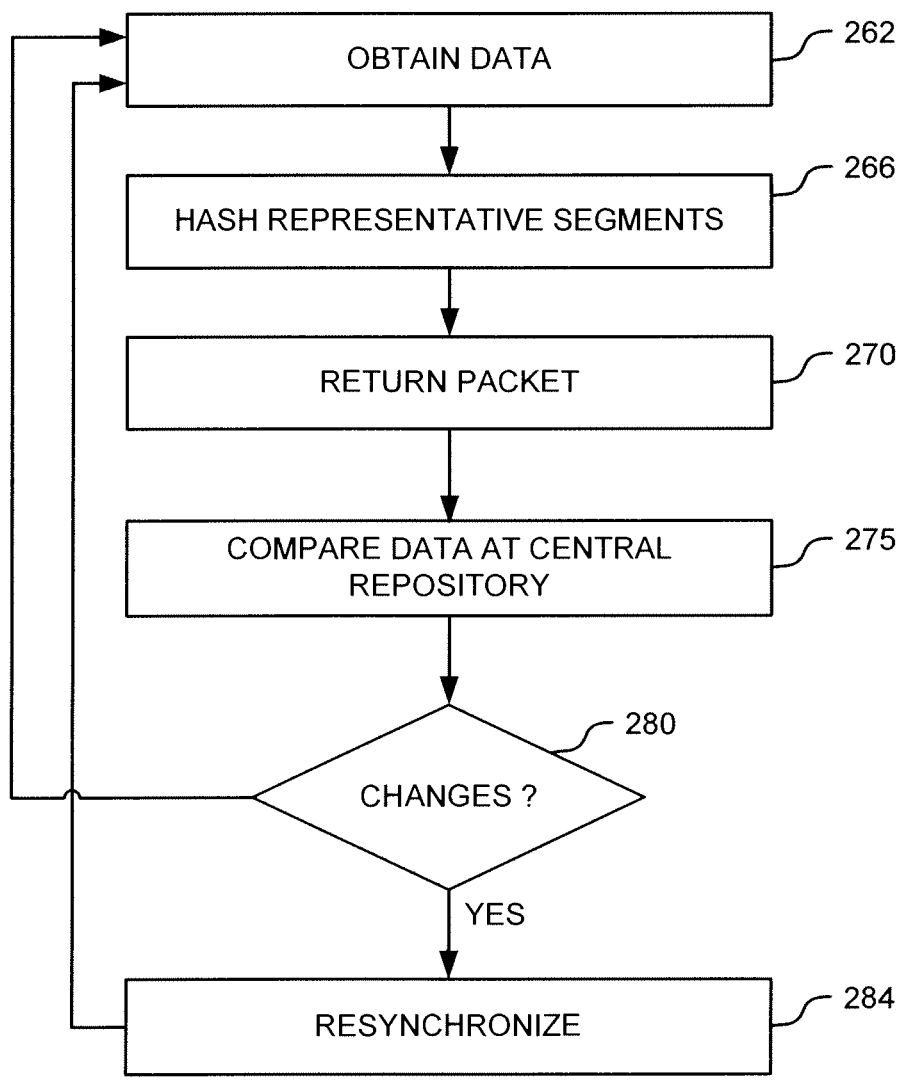
FIG. 8 is a diagram illustrating another example process for reference table subset updating for synchronization in accordance with one embodiment of the invention.

FIG. 8 is a diagram illustrating another example process for reference table subset updating for synchronization in accordance with one embodiment of the invention. At step 262 and 266, a client system obtains data for storage and hashes representative segments of that data to determine de duplication signatures. Any of a number of techniques can be used to identify the representative segments that are determined for this process. For example, the first several segments can be chosen, a periodic or random sampling can be made, the most utilized segments from previous de duplication operations can be chosen, or other criteria used to identify a representative sampling. In steps 270 and 275, the signatures for these representative segments are sent to repository 151 and compared with signatures already existing at the central repository. As illustrated by steps 280 in 284, if changes are made the tables can be resynchronized.

The deduplication table subsets defined in the various embodiments can be used by the client devices for deduplication of data before it is sent to a central repository for storage. Because reference table updates can be client specific and because they can also be sent to different clients at different times, in some embodiments the synchronization does not result in an exact copy of the reference table being instantiated at each client device. Instead, at any given time, different clients can have different instantiations of the reference table and these instantiations are preferably selected based on size, utilization and other factors specific to the client or client group.

Figure 9:
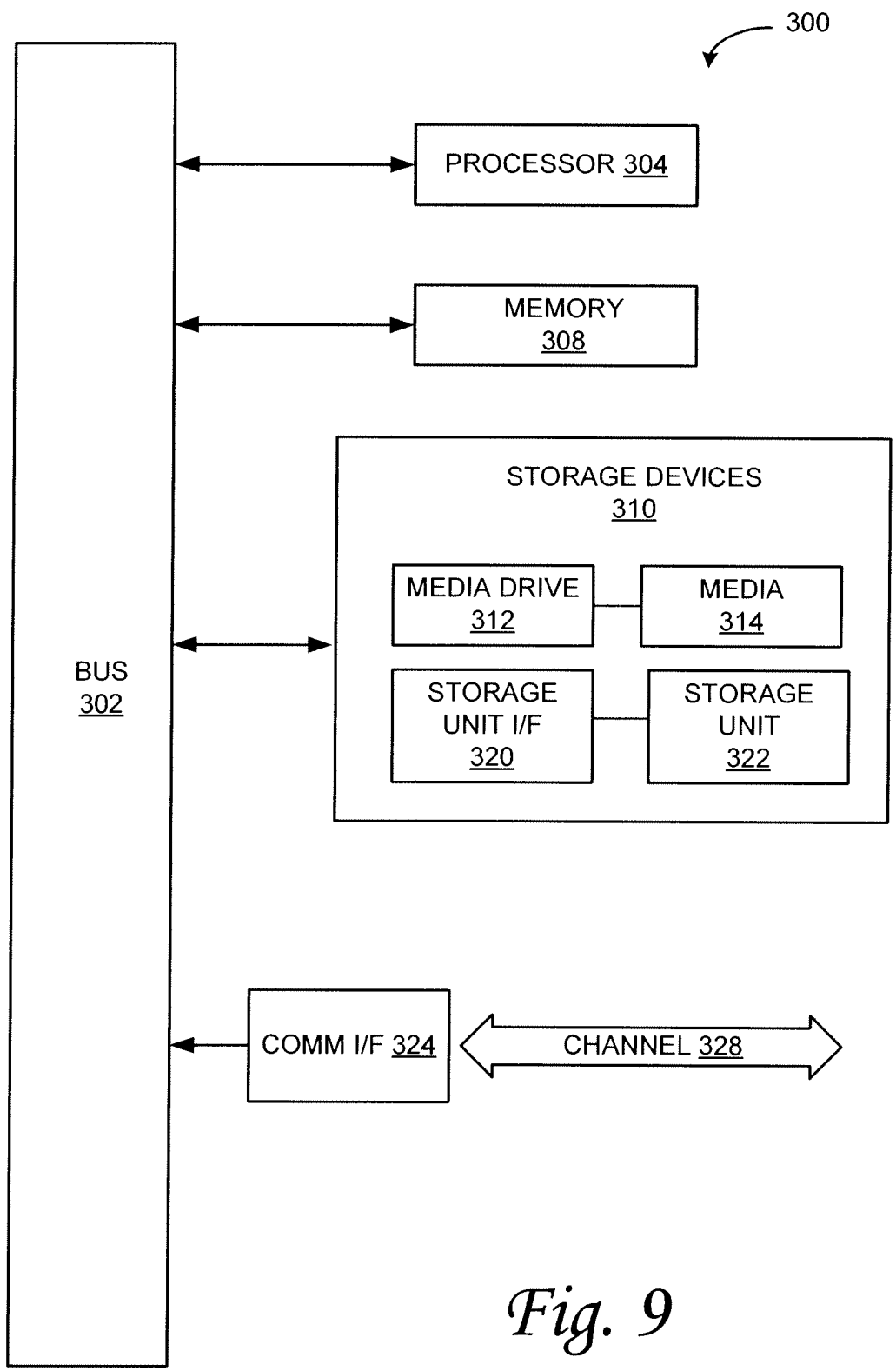
FIG. 9 is a diagram illustrating an example computing system with which aspects of the systems and methods described herein can be implemented in accordance with one embodiment of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 9. Various embodiments are described in terms of this example-computing module 300. After reading this description, it will become apparent to a person skilled in the relevant art how to implement the invention using other computing modules or architectures.

Referring now to FIG. 9, computing module 300 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the example illustrated in FIG. 9, processor 304 is connected to a bus 302, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. F or example, a hard disk drive, a floppy disk drive, a magnetic tape drive, an optical disk drive, a CD or DVD drive (R or RW), or other removable or fixed media drive might be provided. Accordingly, storage media 314, might include, for example, a hard disk, a floppy disk, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. These signals can deliver the software and data from memory or other storage medium in one computing system to memory or other storage medium in computing system 300. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 308, storage unit 320, and media 314. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented data deduplication method, the method comprising:

with one or more computing systems of a shared storage system that maintains a deduplicated data store and that is in networked communication with a plurality of client computing systems that are physically separate from the shared storage system and share the deduplicated data store:

determining whether a first data segment included in data generated by an application executing on a first computing system of the plurality of client computing systems is already stored in the shared storage system;

if the first data segment is not already stored in the shared storage system, updating a central reference table of the shared storage system to include an entry corresponding to the first data segment;

determining a first subset of the references in the central reference table for inclusion in a first updated partial instantiation of the central reference table based on one or more of data segment size information and data segment utilization frequency information, the first subset including a reference to the first data segment;

transmitting the first updated partial instantiation of the central reference table from the shared storage system to a second computing system of the plurality of client computing systems such that, subsequent to said transmitting, a partial instantiation of the central reference table local to the second computing system includes the entry corresponding to the first data segment;

determining a second subset of the references in the central reference table for inclusion in a second updated partial instantiation of the central reference table based on one or more of data segment size information and data segment utilization frequency information, the second subset different than the first subset; and transmitting the second updated partial instantiation of the central reference table to a third computing system of the plurality of client computing systems such that, subsequent to transmission of the first and second updated partial instantiations, a partial instantiation of the central reference table local to the third computing system is different from the partial instantiation of the central reference table local to the second computing system, and does not include the entry corresponding to the first data segment.

2. The method of claim 1, wherein the partial instantiations of the central reference table local to the second and third computing systems are proper subsets of the central reference table.

3. The method of claim 1, wherein said determining the first subset is based on a combination of data segment utilization frequency information and data segment size information.

4. The method of claim 3, wherein the combination comprises a weighted combination of data segment utilization rate and data segment size.

5. The method of claim 1 wherein said determining the first subset is in response to receiving the first data segment from the first computing system at the shared storage system.

6. The method of claim 5 further comprising storing the first data segment in the shared storage system.

7. The method of claim 1 further comprising, subsequent to said transmitting the first updated partial instantiation of the central reference table, receiving a signature corresponding to the first data segment from the second computing system at the shared storage system, without receiving the first data segment itself.

8. A system, comprising:
a shared deduplicated storage repository comprising computer memory; and
a server system including one or more computing devices comprising computer hardware, the server system in networked communication with a plurality of client computing systems which are physically separate from the server system, the server system configured to:
determine whether a first data segment included in data generated by an application executing on a first computing system of the plurality of client computing systems is already stored in the shared deduplicated storage repository;

if the first data segment is not already stored in the shared deduplicated storage repository, update a central reference table of the shared storage system to include an entry corresponding to the first data segment;

select a first subset of the references in the central reference table for inclusion in a first updated partial instantiation of the central reference table based on one or more of data segment size information and data segment utilization frequency information, the first subset including a reference to the first data segment;

transmit the first updated partial instantiation of the central reference table from the server system to a second computing system of the plurality of client computing systems such that, subsequent to the transmission of the updated partial instantiation of the central reference table, a partial instantiation of the central reference table local to the second computing system includes the entry corresponding to the first data segment;

select a second subset of the references in the central reference table for inclusion in a second updated partial instantiation of the central reference table based on one or more of data segment size information and data segment utilization frequency information, the second subset different than the first subset; and transmit the second updated partial instantiation of the central reference table to a third computing system of the plurality of client computing systems such that, subsequent to transmission of the first and second updated partial instantiations, a partial instantiation of the central reference table local to the third computing system is different from the partial instantiation of the central reference table local to the second computing system, and does not include the entry corresponding to the first data segment.

9. The system of claim 8, wherein the partial instantiations of the central reference table local to the second and third computing systems are proper subsets of the central reference table.

10. The system of claim 8, wherein the server system is further configured to determine additional entries to include in the first subset based on a combination of data segment utilization frequency information and data segment size information.

11. The system of claim 10, wherein the combination comprises a weighted combination of data segment utilization rate and data segment size.

12. The system of claim 8 wherein the server system receives the first data segment from the first computing system prior to determining whether the first data segment included in the data generated by the application is already stored in the shared deduplicated storage repository.

13. The system of claim 12 wherein the server system is further configured to store the first data segment in the shared deduplicated storage repository.

14. The system of claim 8 wherein subsequent to transmission of the first updated partial instantiation of the central reference table to the second computing system, the server system receives from the second computing system a signature corresponding to the first data segment, and wherein the server system is configured to update the central reference table in response to receipt of the signature.

\* \* \* \* \*